(12) United States Patent
Amitai

(10) Patent No.: US 7,724,441 B2
(45) Date of Patent: May 25, 2010

(54) LIGHT GUIDE OPTICAL DEVICE

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 19 days.

(21) Appl. No.: 12/287,900

(22) Filed: Oct. 14, 2008

(65) Prior Publication Data
US 2009/0052046 A1    Feb. 26, 2009

Related U.S. Application Data

(62) Division of application No. 10/508,203, filed as application No. PCT/IL03/00237 on Mar. 19, 2003, now Pat. No. 7,457,040.

(51) Int. Cl.
*G02B 27/14* (2006.01)
*G09G 5/00* (2006.01)

(52) U.S. Cl. .................. 359/629; 359/630; 362/26; 345/7; 250/227.11

(58) Field of Classification Search .............. 359/13, 359/15, 618, 629, 630, 633, 636, 721; 362/26, 362/241, 247, 249.02, 249.06, 615; 345/7–9, 345/175; 349/33, 65; 385/11, 16, 18; 250/227.11; 252/299.61
See application file for complete search history.

(56) References Cited

U.S. PATENT DOCUMENTS

| | | | |
|---|---|---|---|
| 3,491,245 A * | 1/1970 | Hardesty | ............... 250/227.11 |
| 4,711,512 A | 12/1987 | Upatnieks | |
| 4,775,217 A | 10/1988 | Ellis | |
| 4,978,952 A * | 12/1990 | Irwin | ......................... 345/102 |
| 5,076,664 A | 12/1991 | Migozzi | |
| 5,231,642 A | 7/1993 | Scifres et al. | |
| 5,369,415 A | 11/1994 | Richard et al. | |
| 5,453,877 A | 9/1995 | Gerbe et al. | |
| 5,619,601 A | 4/1997 | Akashi et al. | |
| 5,724,163 A | 3/1998 | David | |
| 5,883,684 A * | 3/1999 | Millikan et al. | ............... 349/65 |
| 6,144,347 A | 11/2000 | Mizoguchi et al. | |
| 6,404,947 B1 | 6/2002 | Matsuda | |
| 6,671,100 B1 | 12/2003 | McRuer | |
| 6,775,432 B2 | 8/2004 | Basu | |
| 7,016,113 B2 | 3/2006 | Choi et al. | |
| 7,175,304 B2 * | 2/2007 | Wadia et al. | ................ 362/241 |
| 2002/0015233 A1 | 2/2002 | Park | |

FOREIGN PATENT DOCUMENTS

| | | |
|---|---|---|
| EP | 0 380 035 | 8/1990 |
| FR | 2 638 242 | 4/1990 |
| WO | WO01/95027 | 12/2001 |

* cited by examiner

*Primary Examiner*—Loha Ben

(57) ABSTRACT

The invention provides an optical device, including a light-transmitting substrate, optical means for coupling light into the substrate by total internal reflection, and a plurality of partially reflecting surfaces carried by the substrate, characterized in that the partially reflecting surfaces are parallel to each other and are not parallel to any of the edges of the substrate.

17 Claims, 19 Drawing Sheets

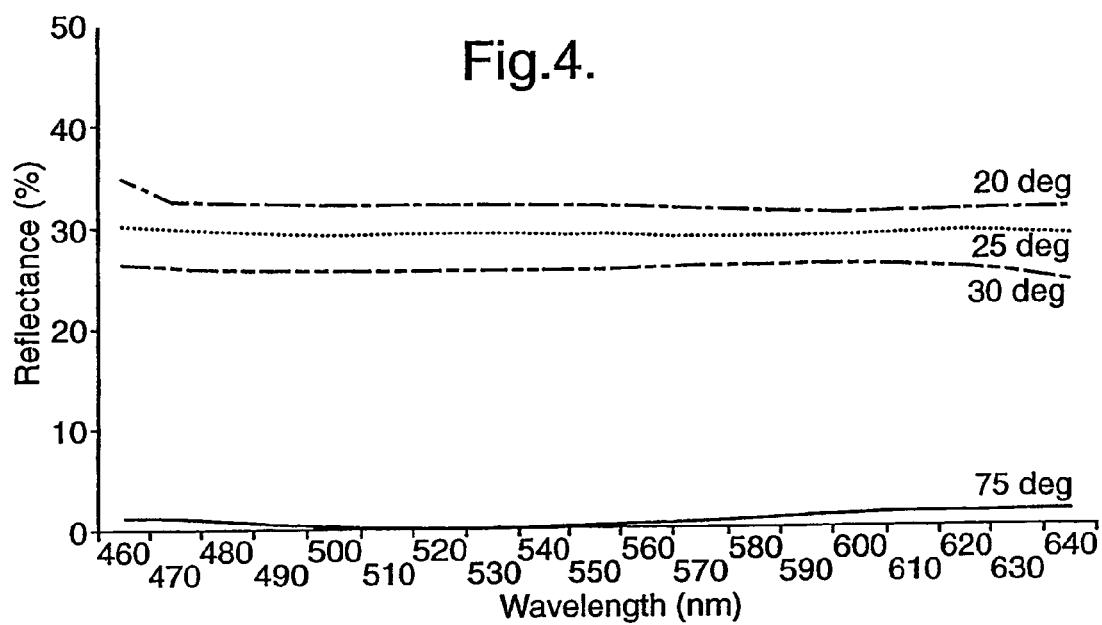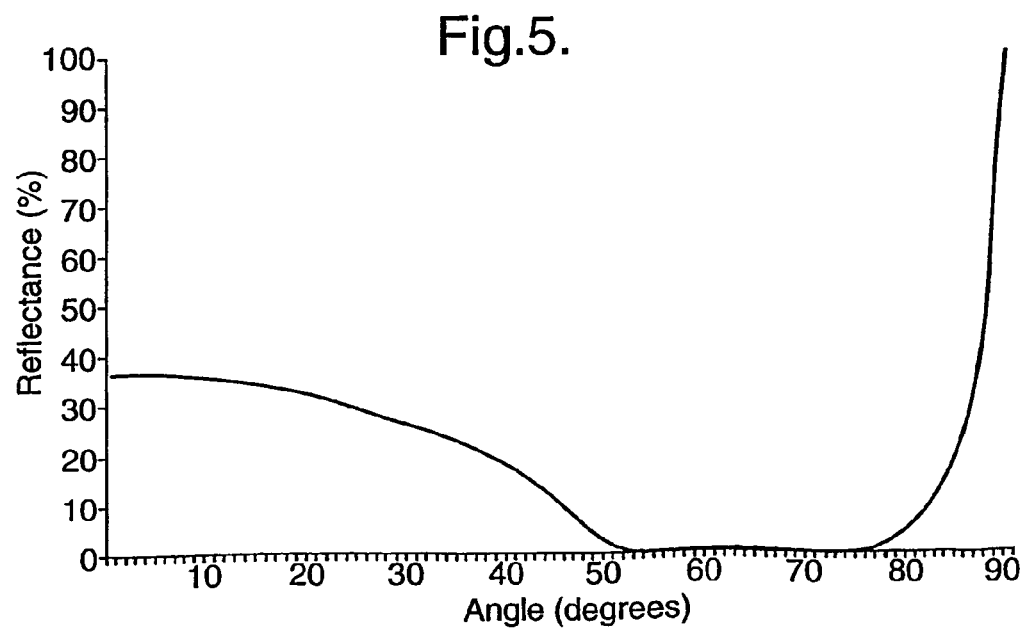

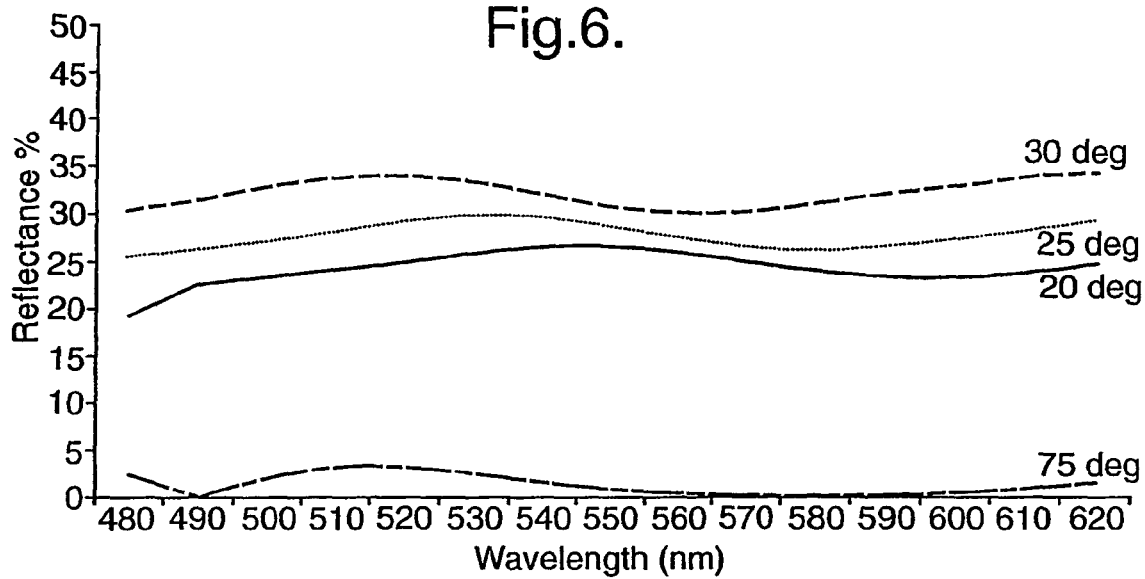
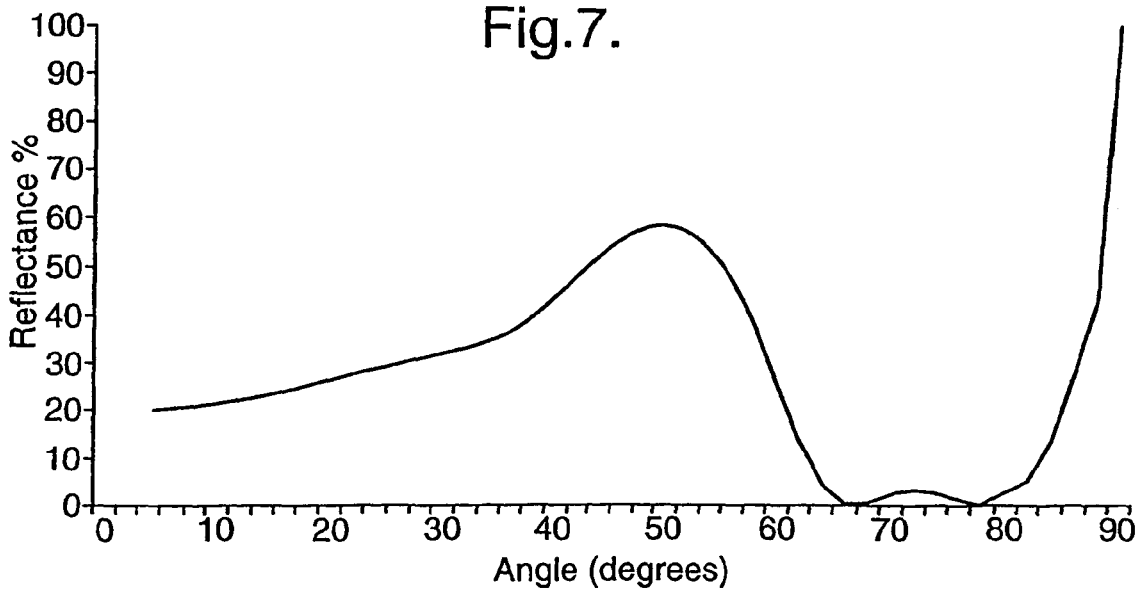

LIGHT GUIDE OPTICAL DEVICE

This application is a division of application Ser. No. 10/508,203 filed on Apr. 19, 2005 for a Light Guide Optical Device, now U.S. Pat. No. 7,457,040.

FIELD OF THE INVENTION

The present invention relates to substrate-guided optical devices, and particularly to devices which include a plurality of reflecting surfaces carried by a common light-transmissive substrate, also referred to as a light-guide.

The invention can be implemented to advantage in a large number of imaging applications, such as, for example, head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the important applications for compact optical elements is in head-mounted displays wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. Unfortunately, as the desired field-of-view (FOV) of the system increases, such a conventional optical module becomes larger, heavier, bulkier and therefore, even for moderate performance device, inpractical. This is a major drawback for all kinds of displays but especially in head-mounted applications, wherein the system must necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box of the optical viewing angles resulting from these designs is usually very small—typically less than 8 mm. Hence, the performance of the optical system is very sensitive, even to small movements of the optical system relative to the eye of the viewer, and do not allow sufficient pupil motion for conveniently reading text from such displays.

DISCLOSURE OF THE INVENTION

The present invention facilitates the design and fabrication of very compact light-guide optical elements (LOE) for, amongst other applications, head-mounted displays. The invention allows relatively wide FOV's together with relatively large eye-motion-box values. The resulting optical system offers a large, high-quality image which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low-visibility landing operation. Furthermore, there have recently been numerous proposals and designs for HUDs in automotive applications where they can potentially assist the driver in driving and navigation duties. Nevertheless, state-of-the-art HUDs suffer several significant drawbacks. All HUD's of the current designs require a display source that must be offset a significant distance from the combiner to ensure that the source illuminates the entire combiner surface. As a result, the combiner-projector HUD system is necessarily bulky, and large, and requires a considerable installation space, which makes it inconvenient for installation and at times even unsafe to use. The large optical aperture of conventional HUDs also pose a significant-optical design challenge, rendering the HUD's with either a compromising performance, or leading to high cost wherever high-performance is required. The chromatic dispersion of high-quality holographic HUD's is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can be readily installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

Another important application of the present invention is in providing for a large screen with a true three-dimensional (3-D) view. Ongoing developments in information technology have led to an increasing demand for 3-D displays. Indeed, a broad range of 3-D equipment is already on the market. The available systems, however, require users to wear special devices to separate the images intended for left eye and the right eye. Such "aided viewing" systems have been firmly established in many professional applications. Yet further expansion to other fields will require "free viewing" systems with improved viewing comfort and closer adaptation to the mechanisms of binocular vision. State-of-the-art solutions to this problem suffer from various disadvantages and they fall short familiar 2-D displays in terms of image quality and viewing comfort. However, using the present invention it is possible to implement a real high-quality 3-D autostereoscopic display that requires no viewing aids and that can readily be fabricated with standard optical manufacturing processes.

A further application of the present invention is to provide a compact display with a wide FOV for mobile, hand-held application such as cellular phones. In today's wireless internet-access market, sufficient bandwidth is available for full video transmission. The limiting factor remains the quality of the display within the end-user's device. The mobility requirement restricts the physical size of the displays, and the result is a direct-display with a poor image viewing quality. The present invention enables, a physically very compact display with a very large virtual image. This is a key feature in mobile communications, and especially for mobile Internet access, solving one of the main limitations for its practical implementation. Thereby the present invention enables the viewing of the digital content of a full format Internet page within a small, hand-held device, such as a cellular phone.

The broad object of the present invention, therefore, is to alleviate the drawbacks of state-of-the-art compact optical display devices and to provide other optical components and systems having improved performance, according to specific requirements.

The invention therefore provides an optical device, comprising a light-transmitting substrate having at least two major surfaces and edges; optical means for coupling light into said substrate by total internal reflection, and at least one partially reflecting surface located in said substrate.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a generic form of prior art folding optical device;

FIG. 2 is a side view of an exemplary light-guide optical element in accordance with the present invention;

FIGS. 3A and 3B illustrate the desired reflectance and transmittance characteristics of selectively reflecting surfaces used in the present invention for two ranges of incident angles;

FIG. 4 illustrates the reflectance curves as a function of wavelength for an exemplary dichroic coating;

FIG. 5 illustrates a reflectance curve as a function of incident angle for an exemplary dichroic coating;

FIG. 6 illustrates the reflectance curves as a function of wavelength for another dichroic coating;

FIG. 7 illustrates a reflectance curve as a function of incident angle for another dichroic coating;

FIG. 8 is a schematic sectional-view of a reflective surface according to the present invention;

FIGS. 9A and 9B are diagrams illustrating detailed sectional views of an exemplary array of selectively reflective surfaces;

FIG. 10 is a diagram illustrating a detailed sectional view of an exemplary array of selectively reflective surfaces wherein a thin transparent layer is cemented at the bottom of the light-guide optical element;

FIG. 11 illustrates detailed sectional views of the reflectance from an exemplary array of selectively reflective surfaces, for three different viewing angles;

Figure 12:
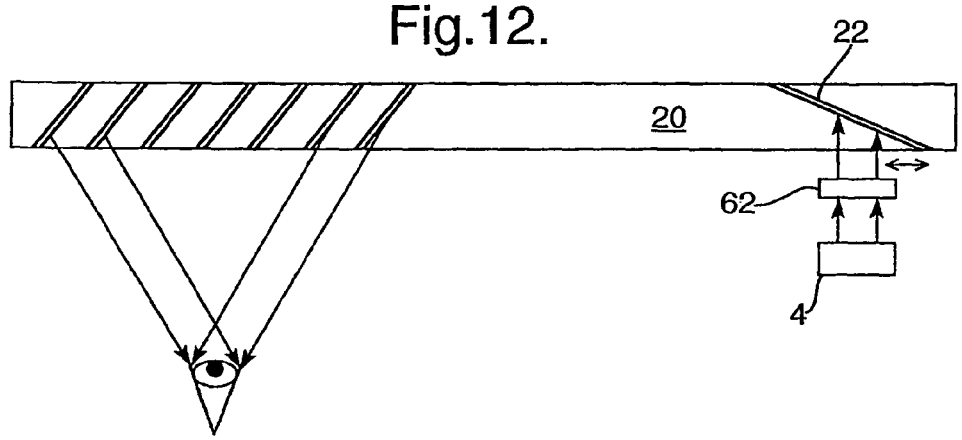
Figure 13:
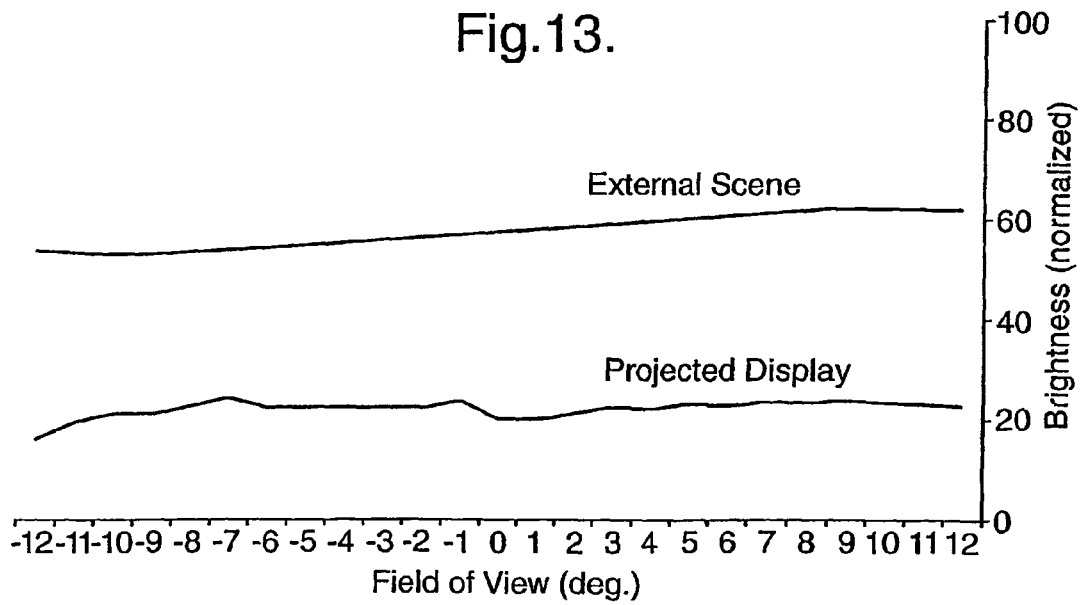
Figure 14:
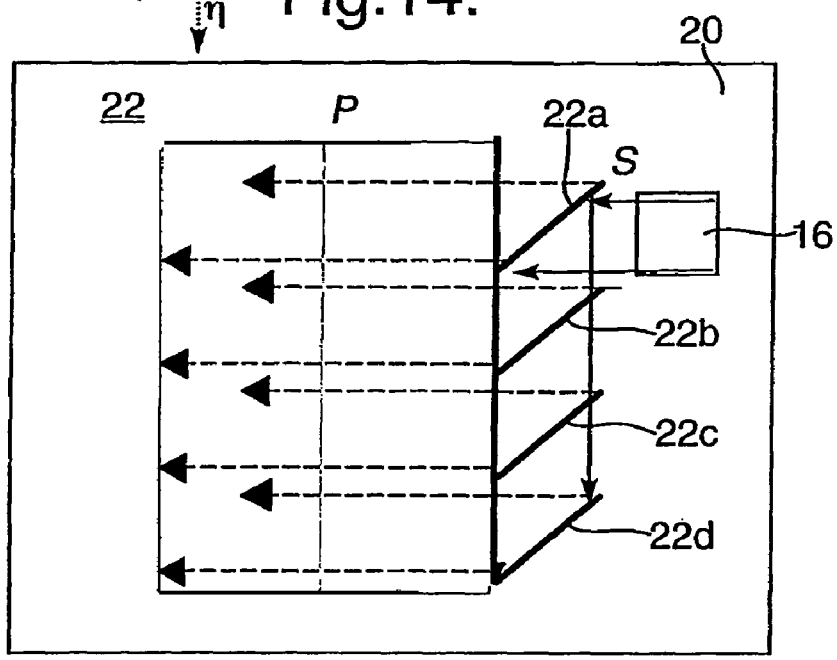
Figure 15:
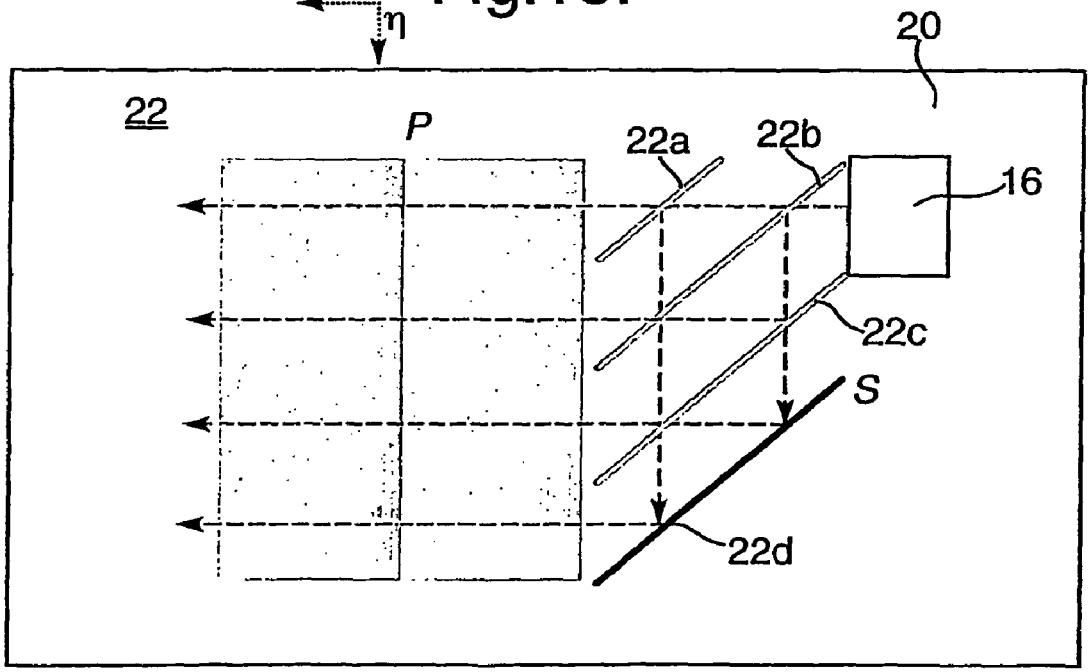
Figure 16:
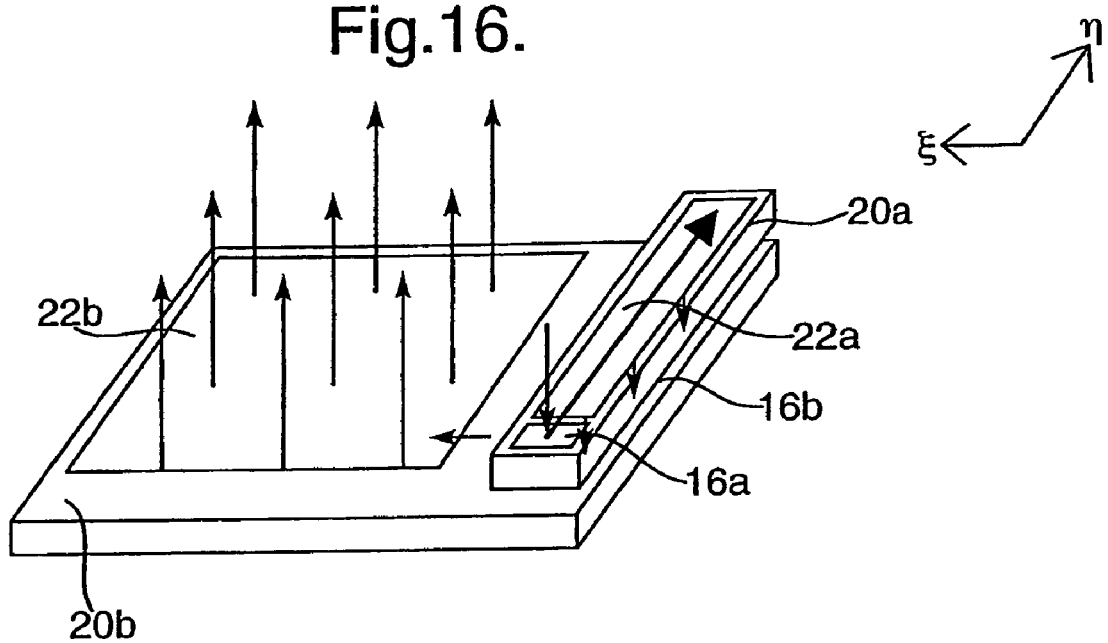
Figure 17:
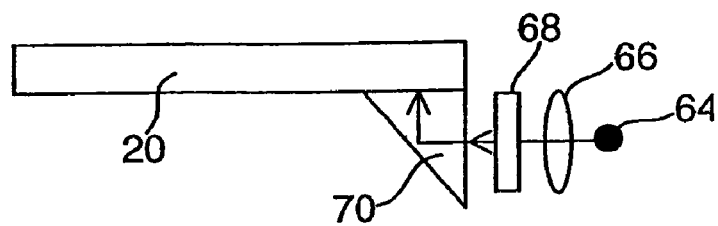
Figure 18:
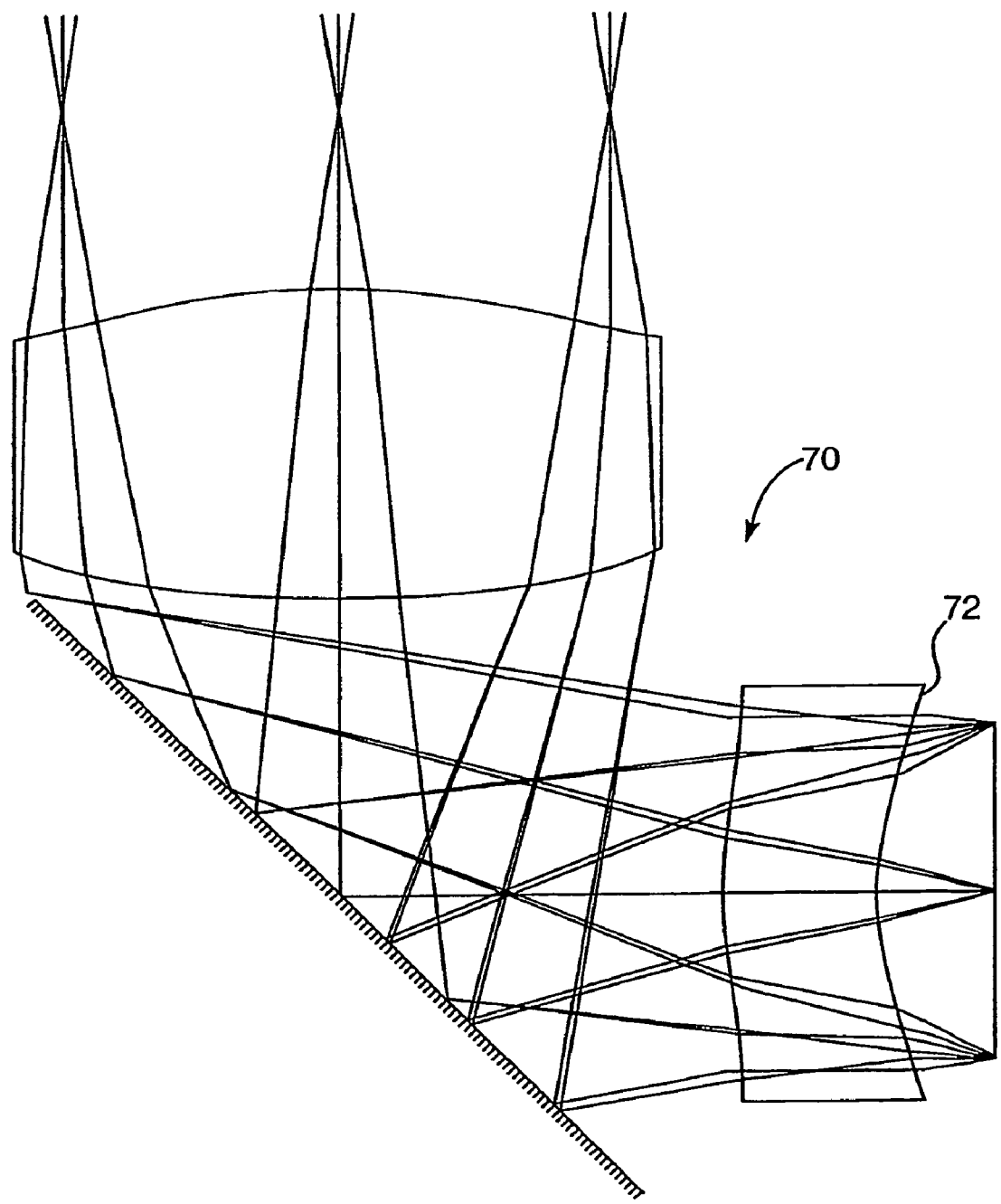
Figure 19:
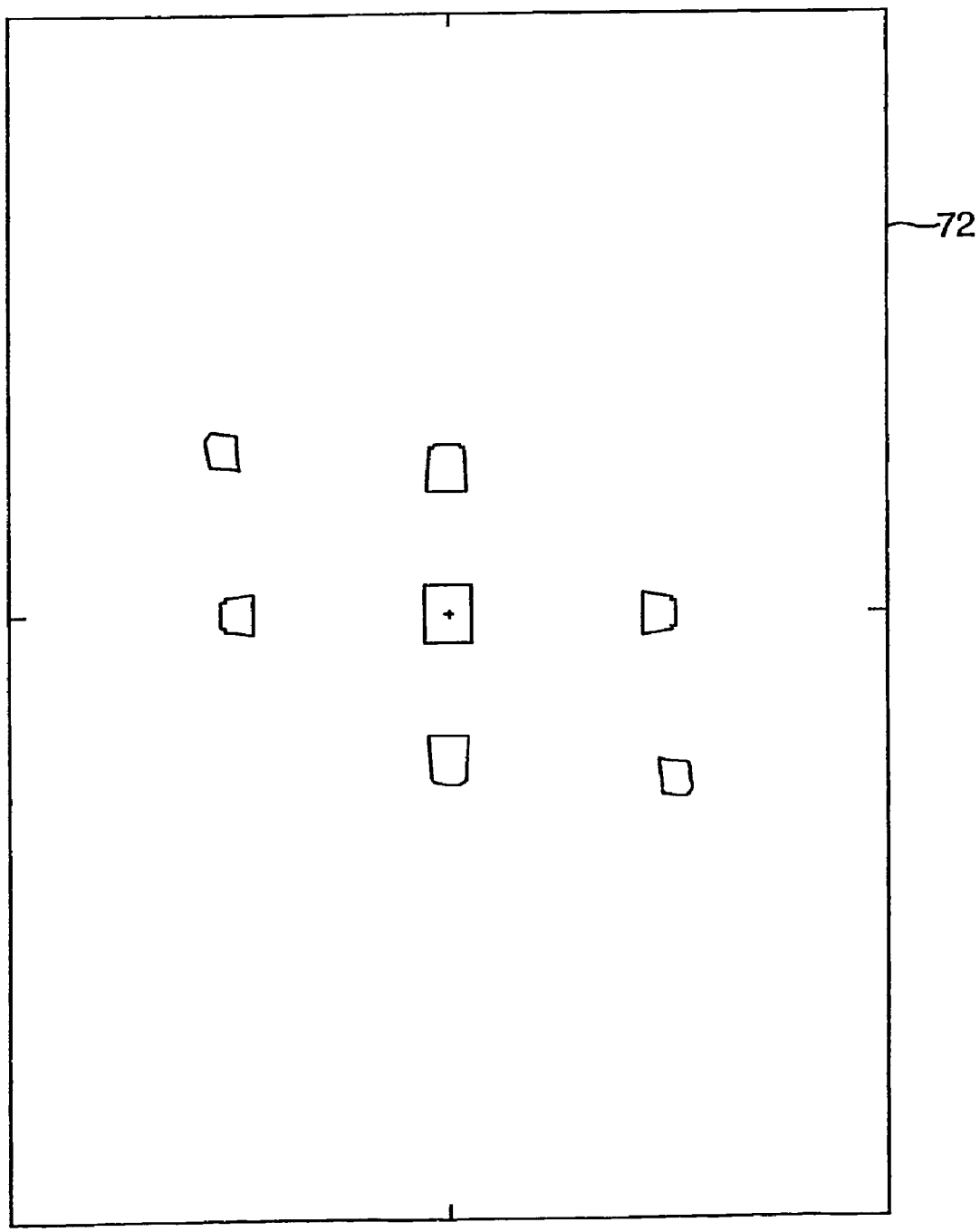
Figure 20:
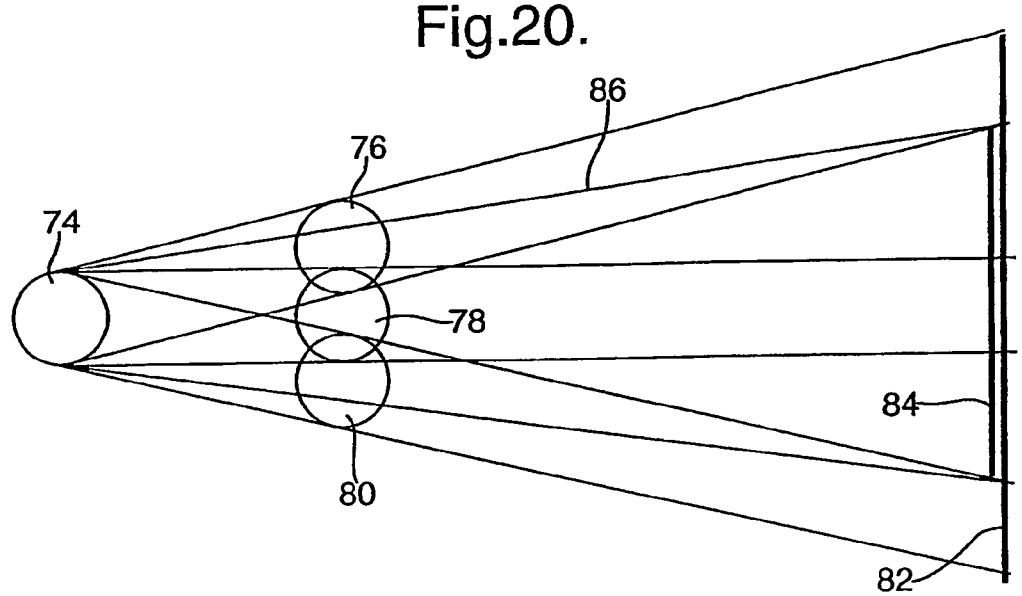
Figure 21:
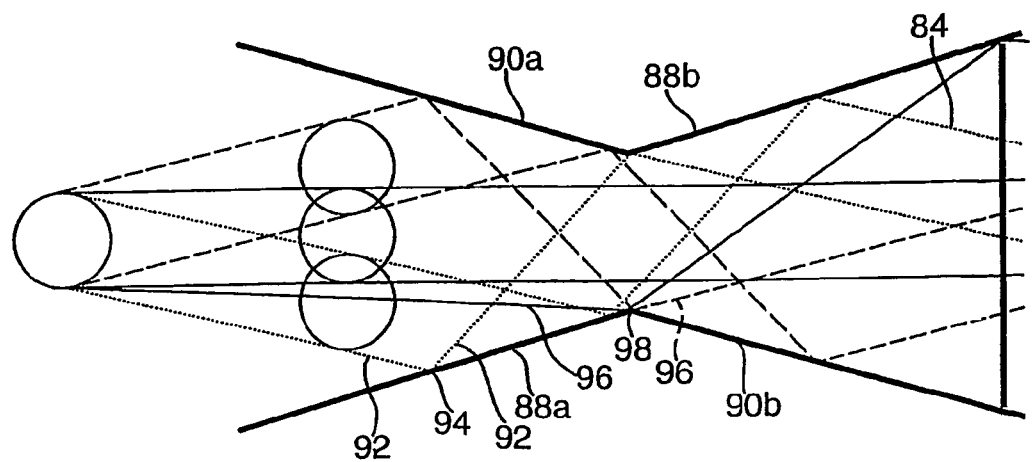
Figure 22A:
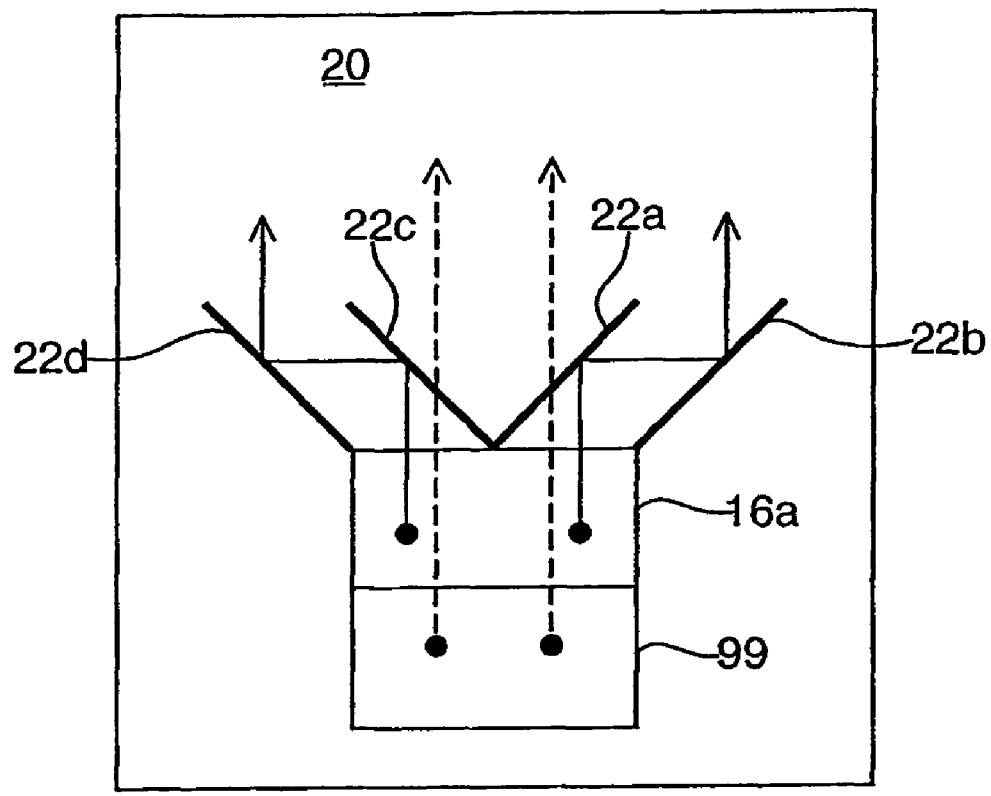
Figure 23:
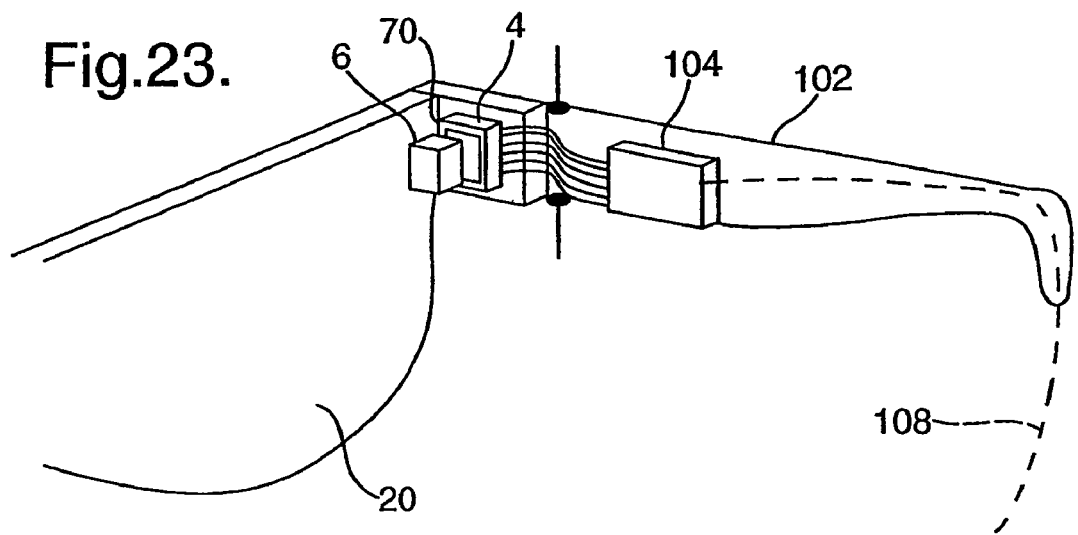
Figure 24:
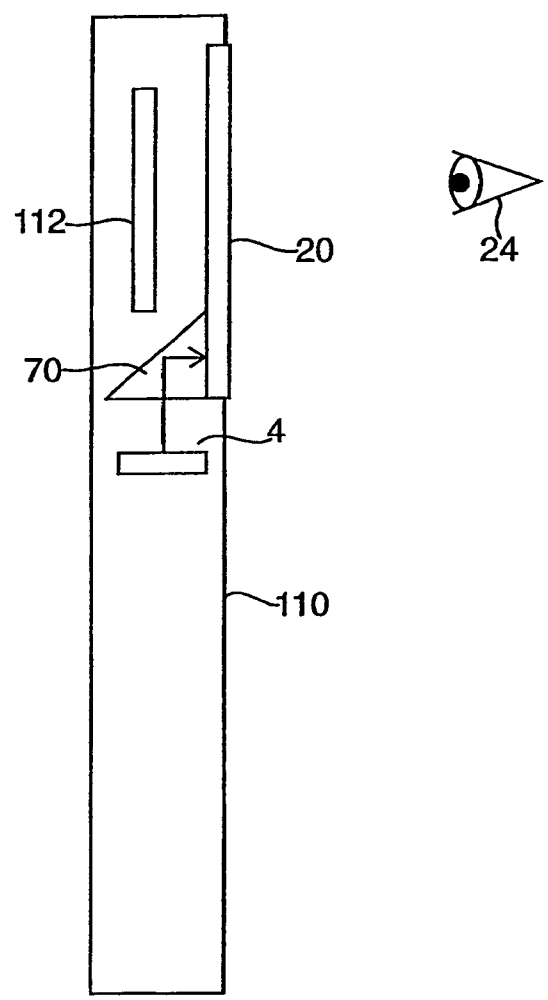
Figure 30:
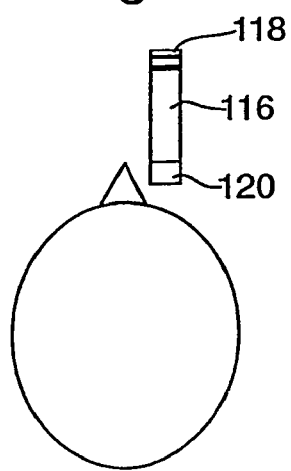
Figure 31:
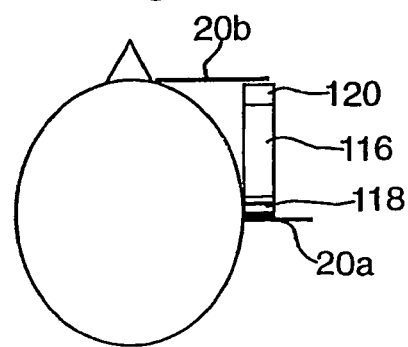
Figure 25:
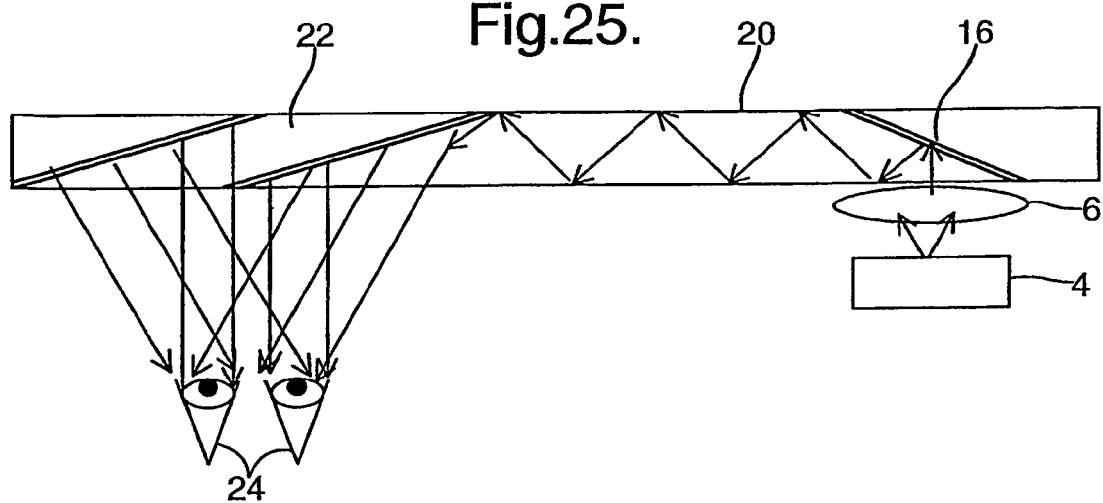
Figure 26:
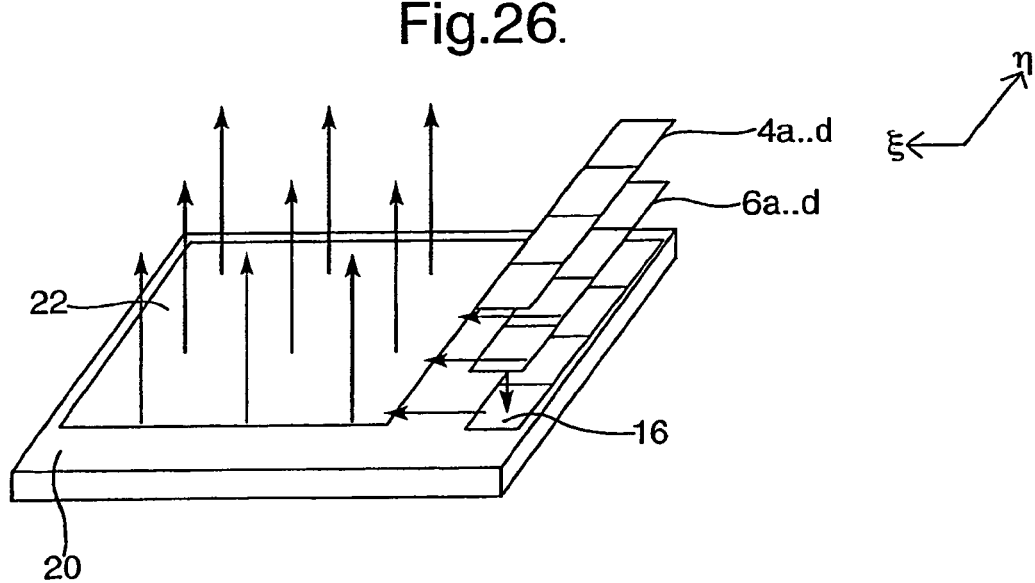
Figure 32:
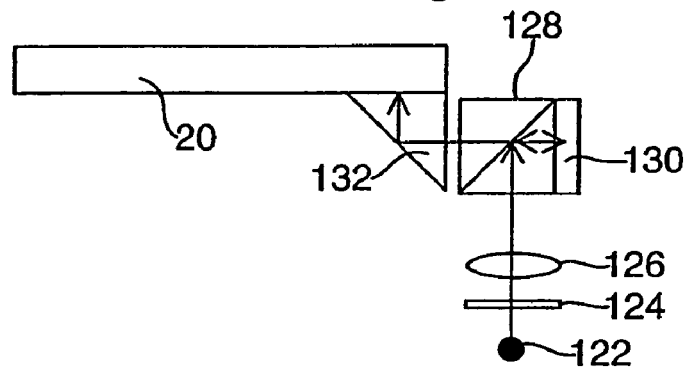
Figure 33:
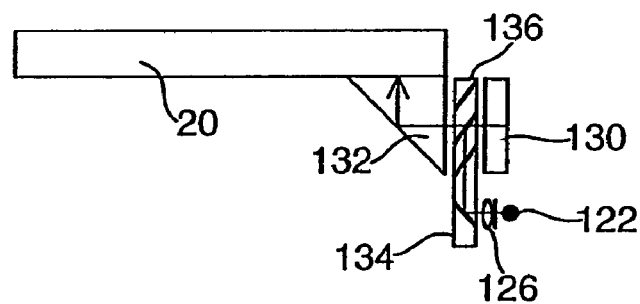
Figure 34:
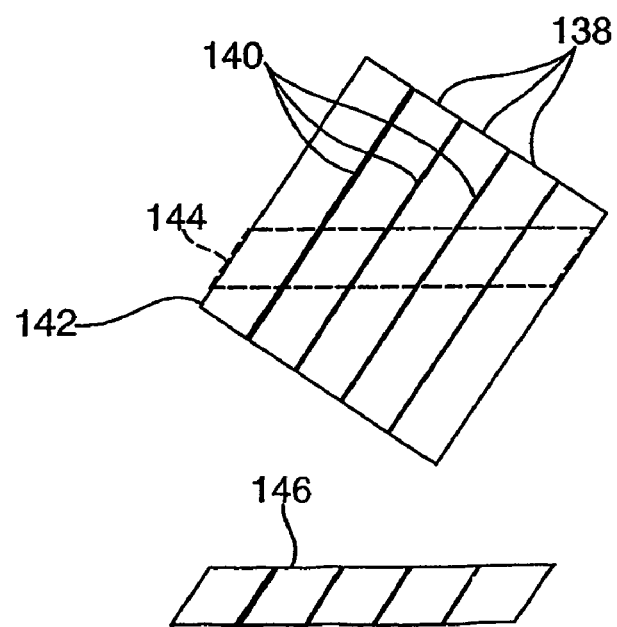

FIG. 12 is a sectional view of an exemplary device according to the present invention, utilizing a half-wavelength plate for rotating the polarization of incoming light;

FIG. 13 shows two graphs representing simulated calculations for the brightness as a function of FOV across the image of the projected display, and the external (see-through) scene;

FIG. 14 is a diagram illustrating a light-guide optical element (LOE) configuration having an array of four partially reflecting surfaces, according to the present invention;

FIG. 15 is a diagram illustrating a light-guide optical element configuration having an array of four partially reflecting surfaces, according another embodiment of the present invention;

FIG. 16 is a diagram illustrating a method to expand a beam along both axes utilizing a double LOE configuration;

FIG. 17 is a side view of a device according to the present invention, utilizing a liquid-crystal display (LCD) light source;

FIG. 18 is a diagram illustrating an optical layout of a collimating and folding optical element according to the present invention;

FIG. 19 is a diagram illustrating the footprint of the light, which is coupled into the substrate, on the front surface of the collimating lens according to the present invention;

FIG. 20 is a diagram illustrating an equivalent, unfolded diagram of an optical layout according to the present invention;

FIG. 21 is a diagram illustrating a diagram of an optical layout according to the present invention utilizing two pairs of parallel reflecting mirrors to achieve a wide field of view;

FIG. 22A is a top view and 22B is a side view of an alternative configuration for expanding light according to the present invention;

FIG. 23 illustrates an exemplary embodiment of the present invention embedded in a standard eye-glasses frame;

FIG. 24 is a diagram illustrating an exemplary method for embedding an embodiment of the present invention within a mobile hand-held device such as a cellular telephone;

FIG. 25 illustrates an exemplary HUD system in accordance with the present invention;

FIG. 26 illustrates an exemplary embodiment of the present invention where the light-guide optical element is illuminated with an array of display sources;

FIGS. 27-29 are diagrams illustrating exemplary embodiment of an imaging system which projects a three-dimensional image to the eyes of a viewer, according to the present invention;

FIG. 30 illustrates an embodiment for conventional implementation of a star's-light amplifier (SLA) device;

FIG. 31 illustrates an exemplary embodiment for an improved implementation of star's-light amplifier (SLA) using devices according to the present invention;

FIG. 32 is a side view of a device according to the present invention, utilizing a reflective liquid-crystal display (LCD) display source with a conventional illuminating device;

FIG. 33 is a side view of a device according to the present invention, utilizing a reflective liquid-crystal display (LCD) display source in which a light-guide element is used for illuminating the source;

FIG. 34 is a diagram illustrating a method for fabricating an array of selectively reflecting surfaces according to the present invention.

Figure 35:
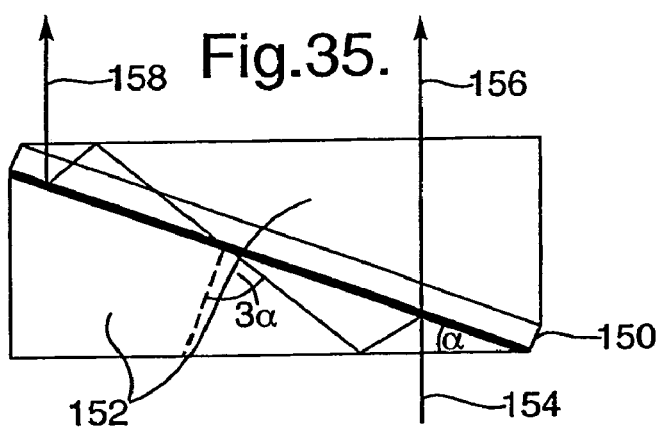
Figure 36:
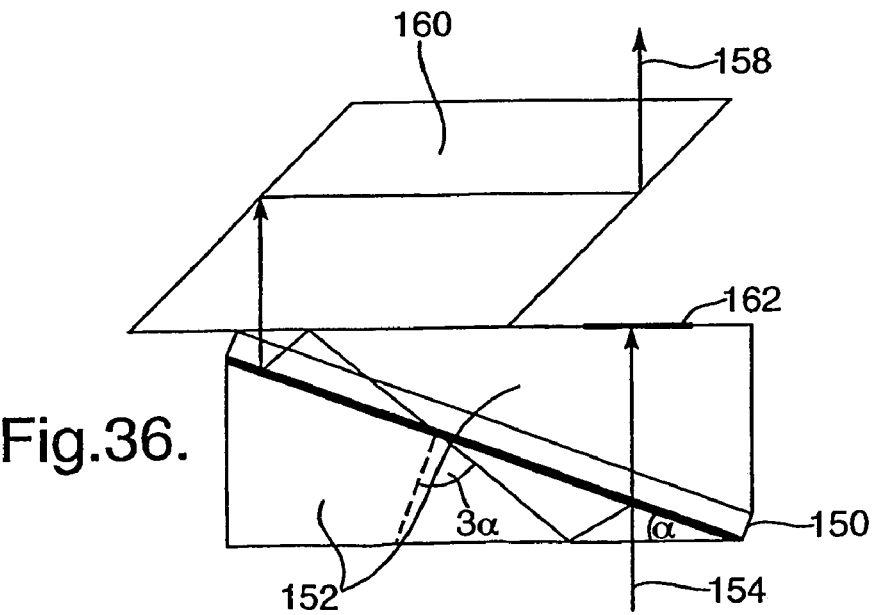

FIG. 35 is a diagram illustrating a measurement arrangement utilizing two prisms to measure the reflectance of a coated plate at two different angles; and FIG. 36 is a diagram illustrating a measurement system utilizing two prisms to measure the reflectance of a coated plate at two different angles further employing a folding prism to align the second output beam with the incident input beam.

DETAILED DESCRIPTION OF PREFERRED EMBODIMENTS

Figure 1:
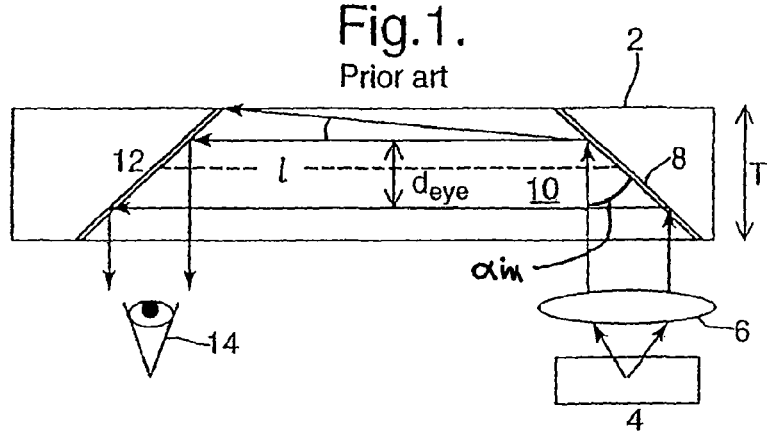

FIG. 1 illustrates a conventional folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye of a viewer 14. Despite the compactness of this configuration, it suffers significant drawbacks; in particular only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein

T is the substrate thickness;

$d_{eye}$ is the desired exit-pupil diameter, and l is the distance between reflecting surfaces 8 and 12.

With angles higher than $\alpha_{max}$ the rays are reflected from the substrate surface before arriving at the reflecting surface 12. Hence, the reflecting surface 12 will be illuminated at an undesired direction and ghost images appear.

Therefore, the maximum achievable FOV with this configuration is:

$$FOV_{max} \approx 2v\alpha_{max}, \quad (2)$$

wherein v is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8-10 mm, the distance between the optical axis of the eye and the side of the head, l, is, typically, between 40 and 80 mm. Consequently, even for a small FOV of 8°, the desired substrate thickness would be of the order of 12 mm.

Methods have been proposed to overcome the above problem. These include, utilizing a magnifying telescope inside the substrate and non-parallel coupling directions. Even with these solutions, however, and even if only one reflecting surface is considered, the system thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T\tan\alpha_{sur} - d_{eye}}{R_{eye}}, \quad (3)$$

wherein $\alpha_{sur}$ is the angle between the reflecting surface and the normal to the substrate plane, and $R_{eye}$ is the distance between the eye of the viewer and the substrate (typically, about 30-40 mm).

Practically tan $\alpha_{sur}$ cannot be much larger than 1; hence, for the same parameters described above for a FOV of 8°, the required substrate thickness here is on the order of 7 mm, which is an improvement on the previous limit. Nevertheless, as the desired FOV is increased, the substrate thickness increases rapidly. For instance, for desired FOVs of 15° and 30° the substrate limiting thickness is 18 mm or 25 mm, respectively.

Figure 2:
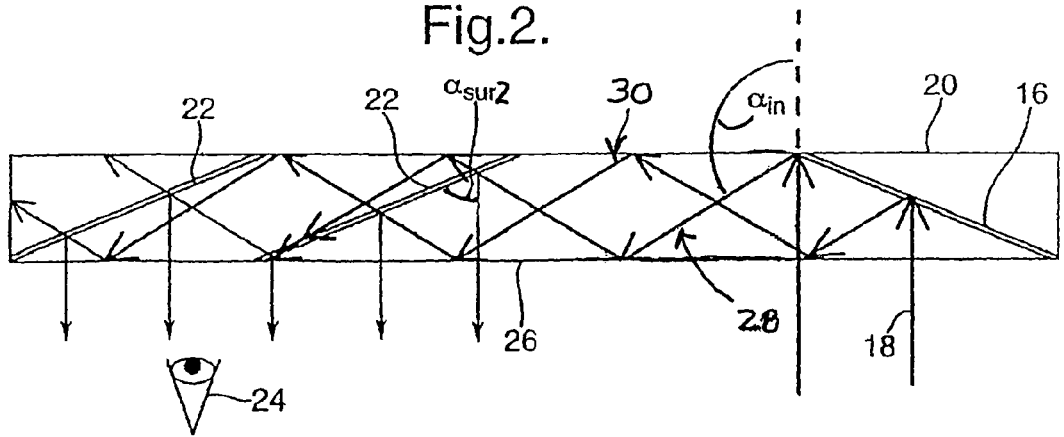

To alleviate the above limitations, the present invention utilizes an array of selectively reflecting surfaces, fabricated within a light-guide optical element (LOE). FIG. 2 illustrates a sectional view of an LOE according to the present invention. The first reflecting surface 16 is illuminated by a collimated display 18 emanating from a light source (not shown) located behind the device. The reflecting surface 16 reflects the incident light from the source such that the light is trapped inside a planar substrate 20 by total internal reflection. After several reflections from the surfaces of the substrate, the trapped waves reach an array of selectively reflecting surfaces 22, which couple the light out of the substrate into the eye of a viewer 24. Assuming that the central wave of the source is coupled out of the substrate 20 in a direction normal to the substrate surface 26, and the off-axis angle of the coupled wave inside the substrate 20 is $\alpha_{in}$, then the angle $\alpha_{sur2}$ between the reflecting surfaces and the normal to the substrate plane is:

$$\alpha_{sur2} = \frac{\alpha_{in}}{2}. \quad (4)$$

As can be seen in FIG. 2, the trapped rays arrive at the selectively reflecting surfaces from two distinct directions 28, 30. In this particular embodiment, the trapped rays arrive at the selectively reflecting surface 22 from one of these directions 28 after an odd number of reflections from the substrate surfaces 26, wherein the incident angle $\beta_{ref}$ ref between the trapped ray and the normal to the selective reflecting surface is:

$$\beta_{ref} = 90° - (\alpha_{in} - \alpha_{sur2}) = 90° - \frac{\alpha_{in}}{2}. \quad (5)$$

The trapped rays arrive at the reflecting surface from the second direction 30 after an even number of reflections from the substrate surfaces 26, where the off-axis angle is $\alpha_{in}'=180°-\alpha_{in}$ and the incident angle between the trapped ray and the normal to the selective reflecting surface 22 is:

$$\beta'_{ref} = 90° - (\alpha'_{in} - \alpha_{sur2}) = 90° - (180° - \alpha_{in} - \alpha_{sur2}) = -90° + \frac{3\alpha_{in}}{2}. \quad (6)$$

In order to prevent undesired reflections and ghost images, it is important that the reflectance be negligible for one of these two directions. The desired discrimination between the two incident directions can be achieved if one angle is significantly smaller than the other one. Two solutions to this requirement, both exploiting the reflection properties of S-polarized light were previously proposed, however, both of these solutions suffer drawbacks. The main disadvantage of the first solution is the relatively large number of reflecting surfaces required to achieve an acceptable FOV. The main drawback of the second configuration is the undesired reflectance of the rays having an internal angle of $\alpha_{in}$. An alternative solution is presently described, exploiting the reflection properties of P-polarized light and in some cases also the S-polarized light, and providing for a shallower reflecting surface inclination so that fewer reflecting surfaces are required for a given application.

The reflection characteristics as a function of incident angle of S- and P-polarized light are different. Consider for example an air/crown glass interface; while both polarizations reflect 4% at zero incidence, the Fresnel reflectance of S-polarized light incident on the boundary rises monotonically to reach 100% at grazing incidence, the Fresnel reflectance of P-polarized light first decreases to 0% at the Brewster's angle and only then rises to 100% at grazing incident. Consequently, one can design a coating with high reflectance for S-polarized light at an oblique incident angle and near-zero reflectance for a normal incidence. Furthermore one can also readily design a coating for a P-polarized light with very low reflectance at high incident angles and a high reflectance for low incident angles. This property can be exploited to prevent undesired reflections and ghost images as described above, by eliminating the reflectance in one of the two directions. For example choosing $\beta_{ref}$~25° from Equations (5) and (6) it can be calculated that:

$$\beta'_{ref}=105°;\ \alpha_{in}=130°;\ \alpha'_{in}=50°;\ \alpha_{sur2}=65°. \quad (7)$$

Figure 3A:
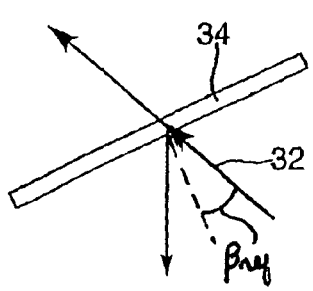
Figure 3B:
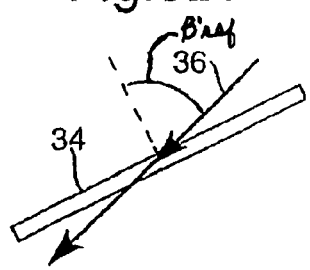

If now a reflecting surface is determined for which $\beta'_{ref}$ is not reflected but $\beta_{ref}$ is, the desired condition is achieved. FIGS. 3A and 3B illustrate the desired reflectance behavior of selectively reflecting surfaces. While the ray 32 (FIG. 3A), having an off-axis angle of $\beta_{ref}$~25°, is partially reflected and coupled out of the substrate 34, the ray 36 (FIG. 3B), which arrives at an off-axis angle of $\beta'_{ref}$~75° to the reflecting surface (which is equivalent to $\beta'_{ref}$~105°), is transmitted through the reflecting surface 34 without any notable reflection.

FIG. 4 shows the reflectance curves of a dichroic coating designed to achieve the above reflectance characteristics, for four different incident angles: 20°, 25°, 30° and 75°, all of them for P-polarized light. While the reflectance of the high-angle ray is negligible over the entire relevant spectrum, the rays at off-axis angles of 20°, 25° and 30° obtain almost constant reflectance of 26%, 29% and 32% respectively, over the same spectrum. Evidently, reflectance decreases with the obliquity of the incident rays.

FIG. 5 illustrates the reflectance curves of the same dichroic coating, as a function of the incident angle for P-polarized light with the wavelength $\lambda$=550 nm. Evidently, there are two significant regions in this graph: between 50° and 80° where the reflectance is very low and between 15° and 40° where the reflectance increases monotonically with decreasing incident angles. Hence, as long as, for a given FOV, one can ensure that the entire angular spectrum of $\beta'_{ref}$ where very low reflections are desired, will be located inside the first region while the entire angular spectrum of $\beta_{ref}$ where higher reflections are required, will be located inside the second region one can ensure the reflection of only one substrate modes into the viewer's eye and ensure a ghost-free image.

Up to now, only P-polarized light was analyzed. This treatment is sufficient for a system using a polarized display source, such as a liquid-crystal-display (LCD) or for a system where the output brightness is not crucial and the S-polarized light can be filtered out. However, for an unpolarized display source, like a CRT or an OLED, and where the brightness is critical, S-polarized light cannot be neglected and it must be taken into account during the design procedure. Fortunately, although it is more challenging than the P-polarized light, it is also possible to design a coating with the same behavior for an S-polarized light as discussed above. That is, a coating having a very low reflectance for an entire angular spectrum of $\beta'_{ref}$ and higher, pre-defined reflections for the respective angular spectrum of $\beta_{ref}$.

FIGS. 6 and 7 illustrate the reflectance curves of the same dichroic coating described above with reference to FIGS. 4 and 5, but now for S-polarized light. Apparently, there are some differences between the behavior of the two polarizations: the region of high angles where the reflectance is very low is much narrower for the S-polarization; it is much more difficult to achieve a constant reflectance for a given angle over the entire spectral bandwidth for the S-polarized light than for the P-polarized light; and finally, the monotonic behavior of the S-polarized light at the angular spectrum of $\beta_{ref}$ where higher reflections are required, is opposite to that of the P-polarized light, that is, the reflectance for the S-polarized light increases with the obliquity of the incident rays. Apparently, this contradicting behavior of the two polarizations at the angular spectrum of $\beta_{ref}$ could be utilized during the optical design of the system to achieve the desired reflectance of the overall light according to the specific requirements of each system.

It is clear that the reflectance of the first reflecting surface 16 (FIG. 2) should be as high as possible, so as to couple as much light as possible from the display source onto the substrate. Assuming that the central wave of the source is normally incident onto the substrate, i.e., $\alpha_0$=180°, then the angle $\alpha_{sur1}$ between the first reflecting surface and the normal to the substrate plane is:

$$\alpha_{sur1} = \frac{\alpha_{in}+\alpha_0}{2};\ \ \alpha'_{sur1} = \frac{\alpha'_{in}+\alpha_0}{2}. \quad (8)$$

The solutions for $\alpha_{sur1}$ and $\alpha'_{sur1}$ in the above example are 155° and 115°, respectively.

Figure 8:
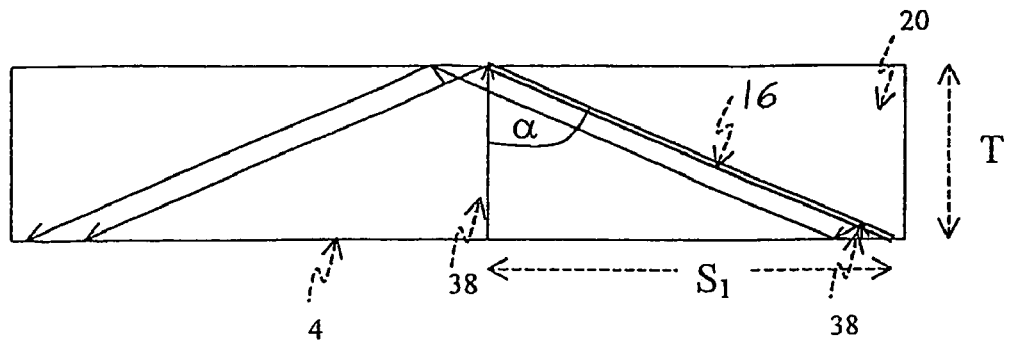

FIG. 8 presents a sectional view of the reflective surface 16 which couples light 38 from a display source (not shown) and traps it inside the substrate 20 by total internal reflection. As plotted here, the projection $S_1$ of the reflecting surface on the substrate surface 40 is:

$$S_1 = T\tan(\alpha), \quad (9)$$

wherein T is the substrate thickness.

The solution of $\alpha=\alpha'_{sur1}$ is preferred, since the coupling area on the substrate surface for the above example is more than 4.5 times larger than it is for the previous solutions. A similar improvement ratio holds for other systems. Assuming that the coupled wave illuminates the entire area of the reflecting surface, after reflection from the surface 16, it illuminates an area of $2S_1 = 2T\tan(\alpha)$ on the substrate surface. On the other hand, the projection of a reflection surface 22 on the substrate plane, is $S_2 = T\tan(\alpha_{sur2})$. To avoid either overlapping or gaps between the reflecting surfaces, the projection of each surface is adjacent to its neighbor. Hence, the number N of reflecting surfaces 22 through which each coupled ray passes during one cycle (i.e., between two reflections from the same surface of the substrate) is:

$$N = \frac{2S_1}{S_2} = \frac{2T \cdot \tan(\alpha_{sur1})}{T \cdot \tan(\alpha_{sur2})}. \quad (10)$$

In this example, where $\alpha_{sur2}=65°$ and $\alpha_{sur1}=115°$, the solution is N=2; that is, each ray passes through two different surfaces during one cycle. This is a conceptual change and a significant improvement over our previous disclosures, where each ray passes through six different surfaces during one cycle. The ability to reduce the number of reflecting surfaces for a given FOV requirement relates to the projection of the reflecting surface on the viewing plane—as the angles in the present disclosure are larger, fewer reflection surfaces are needed to span the image dimensions. Allowing fewer reflection surfaces simplifies the implementation of the LOE and ensures a significant cost saving in its manufacture.

The embodiment described above with regard to FIG. 8 is an example of a method for coupling the input waves into the substrate. Input waves could, however, also be coupled into the substrate by other optical means, including (but not limited to) folding prisms, fiber optic bundles, diffraction gratings, and other solutions.

Also, in the example illustrated in FIG. 2, the input waves and the image waves are located on the same side of the substrate. Other configurations are envisioned in which the input and the image waves could be located on opposite sides of the substrate. It is also possible, in certain applications, to couple the input waves into the substrate through one of the substrate's peripheral sides.

Figure 9A:
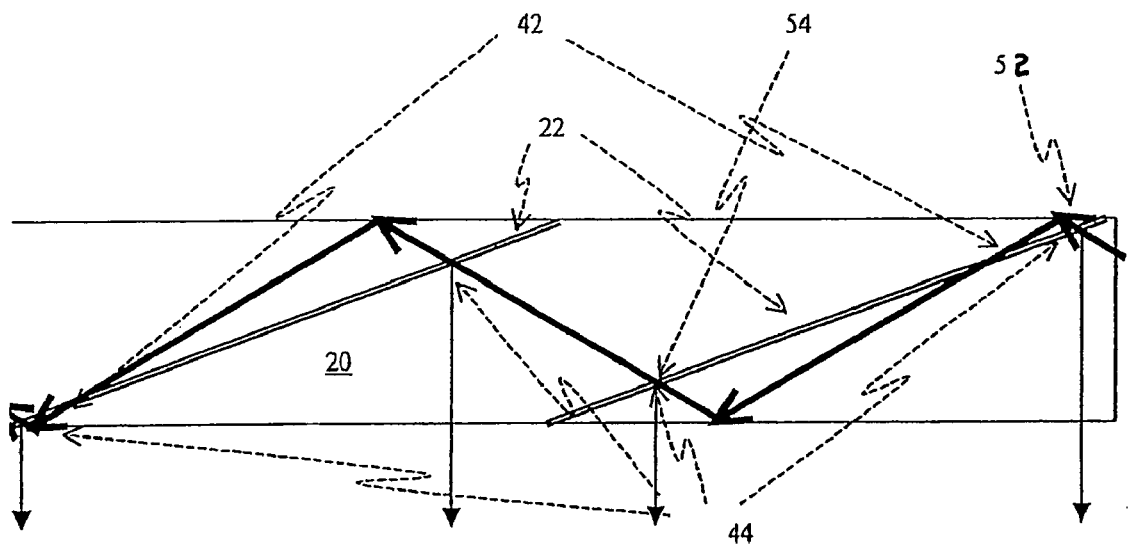

FIG. 9A is a detailed sectional view of an array of selectively reflective surfaces which couple light trapped inside the substrate out and into the eye of a viewer. As can be seen, in each cycle the coupled ray passes through reflecting surfaces 42, having a direction of $\alpha'_{in}=130°$, whereby the angle between the ray and the normal to the reflecting surfaces is ~75° and the reflections from these surfaces are negligible. In addition, the ray passes in each cycle twice through the reflecting surface 44 having a direction of $\alpha_{in}=50°$, where the incident angle is 25° and part of the ray's energy is coupled out of the substrate. Assuming that one array of two selectively reflecting surfaces 22 is used to couple the light onto the viewer's eye, the maximal FOV is:

$$FOV_{max} \approx \frac{2T \cdot \tan\alpha_{sur1} - d_{eye}}{R_{eye}}. \quad (11)$$

Hence, for the same parameters of the examples above, the limiting substrate thickness for an FOV of 8° is in the order of 2.8 mm; for FOVs of 15° and 30°, the limiting substrate thickness is 3.7 mm and 5.6 mm, respectively. These are more favorable values than the limiting thickness of the state-of-the-art solutions discussed above. Moreover, more than two selectively reflecting surfaces can be used. For example, for three selectively reflecting surfaces 22, the limiting substrate thickness for FOVs of 15° and 30° is approximately 2.4 mm and 3.9 mm, respectively. Similarly additional reflecting surfaces may be introduces to, amongst other advantages, reduce the limiting optical thickness further.

For configuration where a relatively small FOV is required, a single partially reflecting surface can be sufficient. For example, for a system with the following parameters: $R_{eye}=25$ mm; $\alpha_{sur}=72°$ and T=5 mm, a moderate FOV of 17° can be achieved even with a single reflecting surface 22. Part of the rays will cross the surface 22 several times before being coupled out into the desired direction. Since the minimal propagation angle inside the substrate to achieve the total-internal reflection condition for BK7 material or similar is $\alpha_{in(min)}=42°$, the propagation direction of the central angle of the FOV is $\alpha_{in(cen)}=48°$. Consequently, the projected image is not normal to the surface but is rather inclined to 12° off-axis. Nevertheless, for many application this is acceptable.

Figure 9B:
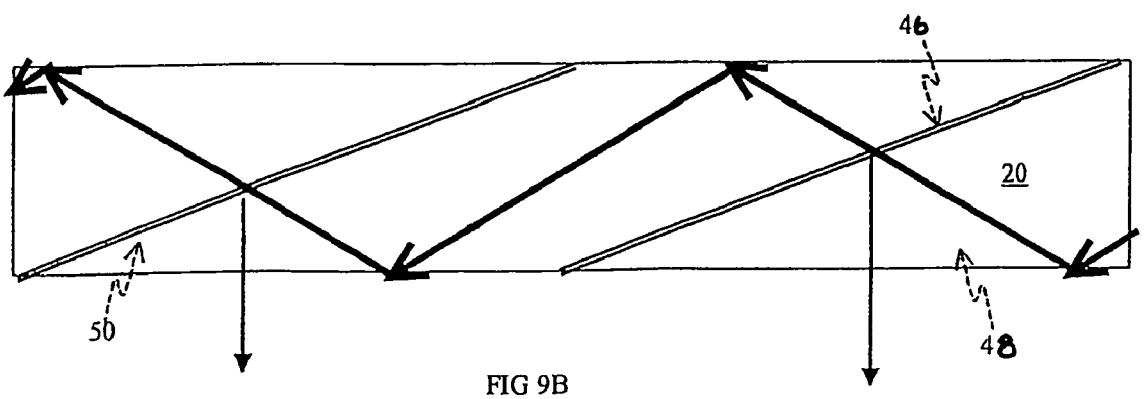

As illustrated in FIG. 9B, each selectively reflecting surface is illuminated by optical rays of different intensities. While the right surface 46 is illuminated by rays immediately after they are reflected from the lower face 48 of the substrate 20, the left surface 50 is illuminated by rays that have already passed through the partially reflecting surface 46 and therefore have lower intensity. To achieve images of uniform brightness, compensation is required for the differences in intensities between the different portions of the image. Indeed, coating the reflecting surfaces with different coatings, whereby the reflectance of surface 46 is lower than the reflectance of surface 50, compensates for the uneven illumination.

Another potential non-uniformity in the resulting image might occur due to the different reflection sequences of different rays that reach each selectively reflecting surface: —some rays arrive directly without a reflection from a selectively reflecting surface; other rays arrive after one or more such reflections. This effect is illustrated in FIG. 9A. A ray intersects the first selectively reflecting surface 22 at the point 52. The incident angle of the ray is 25° and a portion of the ray's energy is coupled out of the substrate. The ray then intersects the same selectively reflecting surface at point 42 at an incident angle of 75° without noticeable reflection, and then intersects again at point 54 at an incident angle of 25° where another portion of the ray's energy is coupled out of the substrate. In contrast the ray shown in FIG. 9B, experiences only one reflection from the same surface. We note that more multiple reflections occur at smaller incident angles. Therefore, one method to compensate for non-uniformity that results from such multiple-intersections is to design a coating where the reflectance increases monotonically with decreasing incident angle, as shown in the reflectivity for the range 10-40° of FIG. 5. It is difficult to fully compensate for such differences in multiple-intersection effects. Nevertheless, in practice, the human eye tolerates significant variations in brightness which remain unnoticed. For near-to-eye displays, the eye integrates all the light which emerges from a single viewing angle and focuses it onto one point on the retina, and since the response curve of the eye is logarithmic, small variations, if any, in the display's brightness will not be noticeable. Therefore, even for moderate levels of illumination uniformity within the display, a human eye experiences a high-quality image. The required moderate uniformity can readily be achieved with an LOE.

Figure 10:
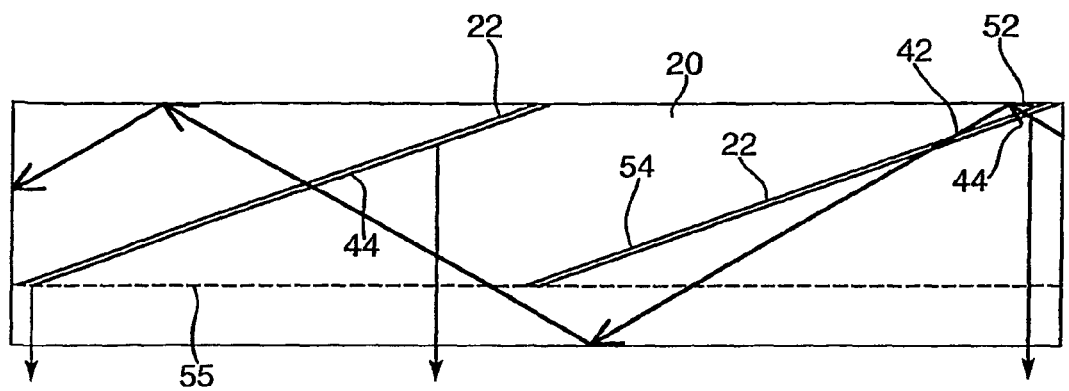

For displays located at a distance from the eye, however, like head-up displays, the non-uniformity due to the multiple intersection effects cannot be tolerated. For these cases, a more systematic method to overcome the non-uniformity is required. FIG. 10 illustrates one possible approach. A thin transparent layer 55 with a thickness $T_{add}$ is cemented at the bottom of the LOE. In this arrangement, the exemplary ray incident at 25°, which according to FIG. 9A intersected the first selectively reflecting surface 22 at three points, intersects this surface only twice and is reflected only once: at the point 52. In this manner, the double-reflection effect does not occur. The thickness $T_{add}$ can be calculated to minimize the double-reflection effect for the entire FOV of the optical system. For example, for optical system having the following parameters:

FOV=24°; $\alpha_{sur}$=64°; $\alpha_{in}$=52°; v=1.51 and T=4 mm, a layer with a thickness of $T_{add}$=2.1 min should be added to totally eliminate the undesired double-pass effect. Evidently, the total thickness of the LOE is now 6.1 mm instead of 4 mm, but for HUD systems where the combiner is relatively large and a mechanical strength is required for the LOE, the increased thickness is not necessarily a drawback. It is possible to add the transparent layer at the top of the LOE or even on both sides of the substrate, wherein the exact configuration will be set according to the specific requirements of the optical system. For the proposed configuration, no matter what the thickness of $T_{add}$ is, at least some of the rays intersect the same selectively reflecting surface twice. For instance, in FIG. 10, the ray passes once through the first reflecting surface 22 at the point 52 having an incident angle of 25° where part of the ray's energy is coupled out of the substrate, and once at an incident angle of 75° without noticeable reflection. Naturally, only the first intersection contributes to the image which is formed by the LOE.

Figure 11:
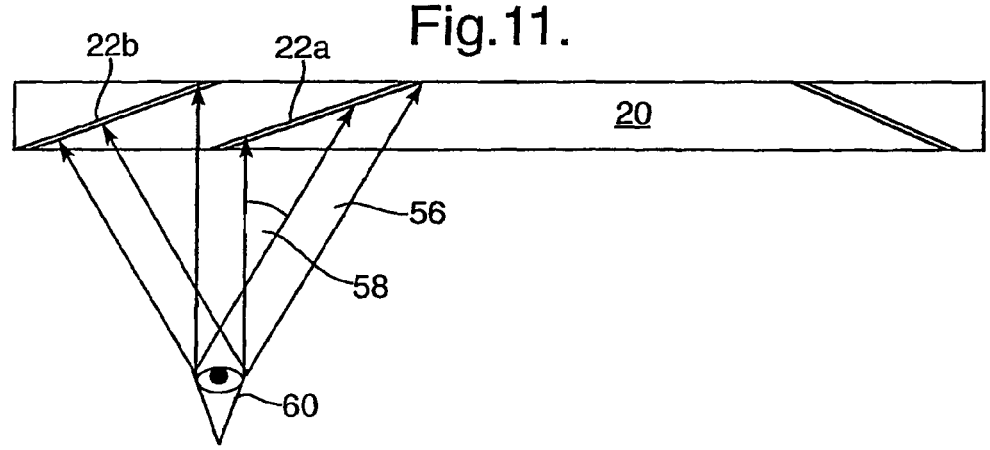

In considering the viewing angles different portions of the resulting image originate at different portions of the partially reflecting surfaces, FIG. 11 illustrates this effect: a sectional view of a compact LOE display system based on the proposed configuration. Here a single plane wave 56, representing a particular viewing angle 58, illuminates only part of the overall array of partially reflecting surfaces 22. Thus, for each point on the partially reflecting surface, a nominal viewing angle is defined, and the reflectance is designed according to this angle.

The design of the coatings of the various partially reflective surfaces of the LOE is performed as follows: For each particular angle, a ray is plotted (taking into account the refraction due to Snell's Law) from the center of the designated eye pupil 60 to the partially reflecting surface. The calculated direction is set as the nominal incident direction and the particular coating is designed according to that direction, by also taking into account prior reflectance related to this particular viewing angle. Hence, for each viewing angle, the average reflectance from the relevant surfaces will be very close to the desired reflectance. In addition, if required, a layer with a thickness $T_{add}$ will be added to the LOE.

An LOE with non-identical selectively reflecting surfaces has two consequences. In see-through systems, such as head-mounted displays for pilots, wherein the viewer should see the external scene through the LOE so the reflectance of the selectively reflecting surfaces should be relatively high. Since here the reflectance coefficient is not the same for all the selectively reflecting surfaces, there is a danger that this would also entail a non-uniform image of the external scene viewed through the substrate. Fortunately, this non-uniformity is rather small, and can be neglected in many cases. In other situations, where such potential non uniformity is crucial, a complementary non-uniform coating could be added on the external surface of the substrate, to compensate for the non-uniformity of the substrate and to achieve a view of uniform brightness over the entire FOV.

In non-see-through systems, such as virtual-reality displays, the substrate is opaque and the transmittance of the system has no importance. However, in such a case, the reflectance may be rather higher than before, and care must be taken in order to ensure that enough intensity passes through the first reflecting surface in order to achieve a uniform brightness across the entire FOV. Another issue that should be taken into account is the polarization of the light. As discussed above, for the selectively reflecting surface coating, P-polarized light is preferred. Fortunately, some of the compact display sources (e.g., nematic liquid crystal displays) are linearly polarized. This would also apply to situations where the display source is oriented such that the incoming light is S-polarized in relation to the reflective surfaces. In such cases it is possible to either design a coatings for the S-polarized light, or, alternatively rotate the source's polarization with a half-wave plate. As illustrated in FIG. 12, the light emerging from the display source 4 is linearly S-polarized. By using a half-wave plate 62, the polarization is rotated so that the desired P-polarized light is incident onto the coupling reflective surface 22.

To illustrate the expected performance of a typical see-through system, a computer simulation has been performed, calculating the brightness of both the projected display and the external scene. The system has the following parameters: T=4.3 mm; $T_{add}$=0; $\alpha_{in}$=50°; FOV=24°; $R_{eye}$=25 mm; v=1.51; the display source is S-polarized, there are two selectively reflecting surfaces, and the nominal reflectance is 22%. FIG. 13 shows the simulation results, normalized to the requested nominal values. There are some small fluctuations in both graphs, but these changes would not be noticeable in near-to-eye applications.

Thus far, only the FOV along the ξ axis has been discussed. The FOV along the orthogonal η axis should also be considered. The FOV along the η axis is not dependent upon the size or number of the selectively reflecting surfaces, but rather, on the lateral dimension along the η axis of the input waves coupled into the substrate. The maximum achievable FOV along the η axis is:

$$FOV_{max} \approx \frac{D_\eta - d_{eye}}{R_{eye} + l/(v\sin\alpha_{in})}, \quad (12)$$

wherein $D_\eta$ is the lateral dimension along η axis of the input waves coupled into the substrate.

That is, if the desired FOV is 30°, then by using the same parameters described above, the limiting lateral dimension is 42 mm. It was previously demonstrated that the longitudinal dimension along the ξ axis of the input waves coupled into the substrate is given by $S_1$=T tan($\alpha_{in}$). A substrate thickness of T=4 mm yields $S_1$=8.6 mm. Seemingly, the lateral extent of the LOE is fivefold larger than the longitudinal dimension. Even for an image aspect ratio of 4:3 (as with a standard video display) and the FOV in the η axis is 22°, the required lateral dimension is approximately 34 mm, still four-fold larger than the longitudinal dimension. This asymmetry is problematic: —a collimating lens with a high numerical aperture, or a very large display source are required. In any case, with such numerical values dimensions, it is impossible to achieve the desired compact system.

An alternative method for solving this problem is presented in FIG. 14. Instead of using an array of reflecting surfaces 22 only along the ξ axis, another array of reflecting surfaces 22a, 22b, 22c, 22d is positioned along the η axis. These reflecting surfaces are located normal to the plane of substrate 20 along the bisector of the ξ and η axes. The reflectance of these surfaces is determined so as to achieve uniform output waves. For example, for four reflecting surfaces, the reflectance of the surfaces should be 75%, 33%, 50% and 100% for the first surface 22a, the second surface 22b and the third surface 22c, and the fourth surface 22d, respectively. This arrangement yields a sequence of wavefronts, each at 25% of the incoming intensity. Typically, such an array of reflecting surfaces can be readily designed for S-polarized light. Fortunately, the light which is S-polarized compared to the partially reflecting surfaces 22a-22d, will be P-polarized compared to the partially reflecting surfaces 22. Therefore, if the vertical expansion of the image in the η axis is affected with S-polarized light, there is no need for a half-wavelength plate to rotate the polarization of the light onto the horizontal expanders in the ξ axis. The arrangements shown in the array assemblies 22 and 22a-22d are only examples. Other arrangements for increasing the lateral dimensions of the optical waves in both axes, in accordance with the optical system and the desired parameters, are possible, some of which are described below.

FIG. 15 illustrates an alternative method to expand the beam along the η axis. In this configuration the reflectance of surfaces 22a, 22b and 22c is 50% for S-polarized light where 22d is a simple 100% mirror. Although the lateral dimension of the vertical expansion for this solution is larger than the previous configuration, it requires only one simple selectively reflecting coating and the overall configuration is easier to fabricate. In general, for each specific optical system the exact method to expand the beam along the η axis can be chosen according to the particular requirements of the system.

Assuming a symmetrical collimating lens 6, the lateral dimension along the η axis after the reflection from the reflective surfaces 22a-22d, is given by $S_\eta = NT \tan(\alpha_{in})$, wherein N is the number of the reflecting surfaces. The maximum achievable FOV along the η axis is now:

$$FOV_{max}^\eta \approx \frac{S_\eta - d_{eye}}{R_{eye} + l/(v\sin\alpha_{in})} = \frac{NT\tan(\alpha_{in}) - d_{eye}}{R_{eye} + l/(v\sin\alpha_{in})}. \quad (13)$$

Since the reflecting array 22a-22d can be located closer to the eye, it is expected that the distance l between the reflecting surfaces will be smaller than in previous examples. Assuming that l=40 mm, and choosing the parameters: T=4 mm; N=4; $\alpha_{in}$=65°; $R_{eye}$=25 mm and v=1.5, the resultant FOV will be:

$$FOV_{max}^\eta \approx 30°. \quad (14)$$

This is an improvement with respect to the previous values obtained above.

FIG. 16 illustrates another method to expand the beam along both axes utilizing a double LOE configuration. The input wave is coupled into the first LOE 20a by the first reflecting surface 16a and then propagating along the ξ axis. The partially reflecting surfaces 22a couple the light out of 20a and then the light is coupled into the second LOE 20b by the reflecting surface 16b. The light is then propagates along the η axis, and then coupled out by the selectively reflecting surfaces 22b. As shown, the original beam is expanded along both axes where the overall expansion is determined by the ratio between the lateral dimensions of the elements 16a and 22b respectively. The configuration given in FIG. 16 is just an example of a double-LOE setup. Other configurations where two or more LOEs are combined together to form complicated optical systems are also possible. For example, three different substrates, the coating of each being designed for one of the three basic colors, can be combined to produce a three-color display system. In that case, each substrate is transparent with respect to the other two colors. Such a system can be useful for applications in which a combination of three different monochromatic display-sources is required in order to create the final image. There are many other examples in which several substrates can be combined together to form a more complicated system.

Another issue to be addressed is the brightness of the system. This issue is important for see-through applications, where it is desired that the brightness of the display will be comparable to that of the external scene, to allow acceptable contrast ratio and convenient observation through the combiner. It is not possible to ensure that the insertion loss of most of the systems is small. For example, as described above for the four-surface combiner of FIG. 14, because of the requested beam expansion along the η axis, the brightness of the optical waves is reduced four-fold. In general for N-reflecting surfaces the brightness reduces by a factor of N. In principle high-brightness display sources can offset this difficulty, but this approach necessarily has a practical limitation. Not only are high-brightness display sources very expensive, they also have high power consumption with the associated very high electrical currents. Furthermore, in most of the displays there is an inherent limitation to the maximal brightness that can be achieved. As an example, for transmission LCDs, which are presently the most abundant source for small displays, the back-illumination light power is limited to avoid undesired effects like flaring which decrease the resolution and contrast ratio of the display. Therefore, other approaches are required to optimize the use of the available light from the source.

One possible method to improve the brightness of the display which reaches the viewer's eye is to control the reflectance of the reflecting surfaces 22 of the LOE according to the eye-motion-box (EMB) of the viewer. As illustrated in FIG. 11, each reflecting surface of the overall array of selectively reflecting surfaces 22, is illuminated by only the part of the overall FOV. Hence, the reflectance of each surface can be set to optimize the brightness of the entire FOV. For example, the reflectance of the right surface 22a in FIG. 11 could be designed to have higher reflectance for the right part of the FOV and the lowest possible reflectance for the left part of the FOV, while the left surface 22b have higher reflectance for the left part of the FOV. A similar design method can be applied to a two-dimensional expansion system. Assuming that η is the vertical axis in FIG. 16, the reflectance of the reflecting surfaces 22a could be designed such that the lower surfaces will have higher reflectance for the lower part of the FOV and the lowest possible reflectance for the higher part of the FOV, while the upper surfaces have higher reflectance for the upper part of the FOV. Therefore, the factor in which the brightness is reduced because of the lateral expansion can be much smaller than R, where R is the ratio between the area of the coupling-in surface 16a and the coupling-out surfaces 22b.

Another method to improve the overall brightness of the system is by controlling the display source brightness without changing the input power. As shown in FIG. 11 above, a large portion of the energy coupled onto the substrate 20 by the reflecting mirror 16 is reflected into the vicinity of the eye pupil 60. To maximize the achievable brightness, however, it is also desirable that most of the light that emerges from the display source couples into the substrate.

FIG. 17 illustrates an example of a substrate-mode display where the display source is a transmission LCD. The light which emerges from the light source 64 and collimated by a lens 66, illuminates an LCD 68. The image from the LCD is collimated and reflected by the optical components 70 onto the substrate 20. FIG. 18 illustrates an optical layout of the collimating/folding lens 70, while FIG. 19 illustrates the footprint of the light, which is coupled into the substrate 20, on the front surface 72 of the lens 70. Usually, for most of the display source, there is a Lambertian distribution of the light, which emerges from the display. That is, the energy is distributed uniformly over the entire angular spectrum of 2π steradians. As can be seen in FIGS. 18 and 19, however, only a small portion of the light which emerges from the display source is actually coupled into the substrate 20. From each point source on the display surface, only a small cone of light of ~20-30° actually illuminate the footprint on the front surface 72 and couples in the substrate 20. Therefore, a significant increase in the brightness can be achieved if the light which emerges from the display is concentrated inside this cone.

One method to achieve such directionality in the source illumination is to use a special selective diffuser for the LCD. Usually, a conventional diffuser scatters the light uniformly in all directions. Alternatively, a selective diffuser can spread the light in such a way that the light from each point source diverges into a required angular cone. In this case the power that the LCD surface illuminates remains the same. For a 20-30° cone, the diverging angle of the light for each point source is reduced by a factor of more than 50 as compared to the π steradians of the Lambertian source, the brightness of the light increases by the same factor. Hence, a significant improvement in the brightness of the system can be achieved with a minimal design and manufacturing effort and without increasing the power consumption of the system.

An alternative solution, which is appropriate not only to LCDs but also to other display sources, is to use an array of micro-lenses that is aligned with the pixels of the display source. For each pixel a micro-lens narrows the diverging beam that emerges from that pixel into the desired angular cone. In fact, this solution is efficient only if the fill-factor of the pixels is a small number. An improved version of this solution is to design the emitting distribution function of the pixels in the pixel-array to make each pixel diverge into the required angle. For example, in OLED displays, efforts are usually made to increase the divergence angle of the single LEDs in order to allow viewing from a wide angle. For our specific LOE display application, however, it is advantageous to keep this divergence angle small, in the order of 20-30°, to optimize the brightness of the system.

As described above with a reference to FIGS. 14 and 15, it is possible to achieve a wide FOV also along the vertical η direction without increasing the volume of the system significantly. There are, however, situations where this solution is not sufficient. This is true especially for systems with a very wide FOV and a constraint on the distance, l, between the couple-in reflective surface 16 and the couple-out selectively reflecting surfaces 22. FIG. 20 illustrates an unfolded optical system with the following parameters: l=70 mm; T=4 mm; $\alpha_{in}$=65°; $R_{eye}$=24 mm; ν=1.51, the eye-motion-box (EMB) is 10 mm and the required vertical FOV is 42°. If we trace the rays from the EMB 74, we find that the light passes through the projection of the EMB on the couple-out optics 22, where 76, 78 and 80 are the projections of the upper, central and lower angles, respectively of the FOV. This means that to achieve the desired FOV the required couple-in aperture 82 is 65 mm; this is a very large aperture that necessarily increases the size of the entire system, even if the substrate remains a thin plate. Alternatively, if only a smaller aperture 84 of 40 mm is allowed, the achievable vertical FOV 86 falls to 23° which is nearly half of the required FOV.

FIG. 21 illustrates a possible solution to this problem. Instead of using a simple rectangular plate 20, the two horizontal edges of the plates are replaced with two pairs of parallel reflecting surfaces, 88a, 88b and 90a, 90b respectively. While the central part of the FOV projects directly through to the aperture 84 as before, the rays from the lower part of the FOV are reflected from surfaces 88a and 88b, while the rays from the upper part of the FOV are reflected from surfaces 90a and 90b. Typically, the angles between the rays trapped inside the substrate and the reflecting surfaces 88 and 90 are sufficiently large to affect total internal reflections, so no special reflecting coating is required for these surfaces.

Since all rays are either traveling directly from the input aperture or reflected twice from a pair of parallel surfaces, the original direction of each ray is maintained, and the original image is not affected.

Indeed, it is important to ensure that each ray which is reflected by surface 88a is also reflected by surface 88b before it impinges on aperture 84. To confirm this, it is sufficient to check two rays paths: —the marginal ray of the extreme angle 92, incident on surface 88a at the point 94, must impinge on surface 88b to the right of its intersection with surface 90a; in addition, the marginal ray 96, incident on surface 88a next to its intersection 98 with surface 90b, must impinge on surface 88b before it crosses the aperture 84. As both marginal rays meet the requirement, necessarily all rays from the FOV that are incident on surface 88a will also impinge on surface 88b. The present example provides for an FOV of 42° with a significantly reduced input aperture 84: 40 mm. Naturally, in cases where l is extremely large, a cascade of two or more pairs of reflecting surfaces can be used to achieve the desired FOV while maintaining an acceptable input aperture.

The embodiment of FIG. 21 is just an example illustrating a simple implementation of this method. The use of pairs of parallel reflecting surfaces in order to decrease the aperture of the system for a given FOV, or alternatively to increase the useable FOV for a given aperture, is not limited to substrate-mode optics and it can be utilized in other optical systems including, but not limited to, free-space systems like head-up displays, episcops or periscopes.

Figure 22B:
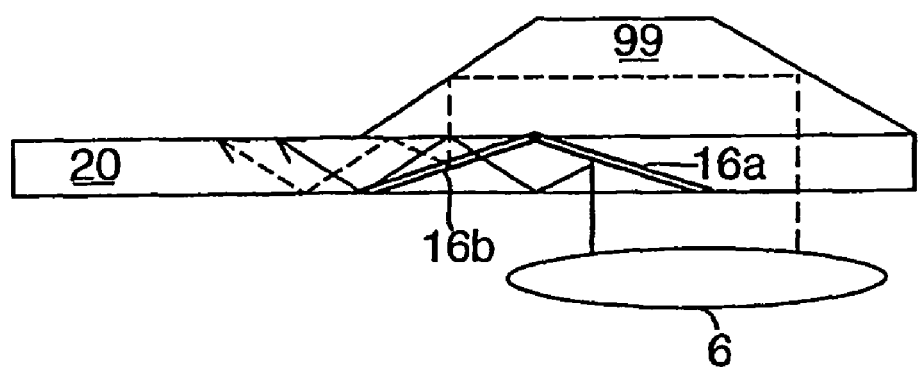

Apparently, as described above with reference to FIG. 21, the lateral dimension of the input aperture of the substrate is 40 mm along the η axis and 8.5 mm along the ξ axis. FIGS. 22A and 22B illustrate an alternative embodiment to that described above with reference to FIGS. 14-15. This approach involves an adjustment between a symmetrical collimating lens 6 and an asymmetrical input aperture. The lateral dimensions of the input aperture are assumed to be D and 4D along the two axes respectively. A lens 6 with an aperture of 2D collimates the image onto the substrate. The front half of the collimated light is coupled into the substrate by the mirror 16a. Two pairs of parallel reflecting surfaces, 22a; 22b and 22c; 22d split the coupled light outward and then reflects it back to its original direction. The rear part of the collimated light passes through the substrate 20 and then folded by the prism 99 back into the substrate. A second mirror 16b couples the folded light onto the substrate 20. Evidently, the lateral dimensions of the input aperture are D and 4D along the two axes respectively, as required.

There are some advantages to the approach describe above with reference to FIG. 22. The system is symmetrical about the η axis and more important, there is no loss of light intensity. This approach is only an example and other similar methods to convert the symmetrical input beam into an asymmetrical coupled light beam are possible. A suitable configuration for expanding the image along the η axis requires careful analysis of the system specifications.

In general, all the different configurations of the light-guide optical elements considered above, offer several important advantages over alternative compact optics for display applications, which include:

1) The input display source can be located very close to the substrate, so that the overall optical system is very compact and lightweight, offering an unparalleled form-factor.

2) In contrast to other compact display configurations, the present invention offers flexibility as to location of the input display source relative to the eyepiece. This flexibility, combined with the ability to locate the source close to the expanding substrate, alleviates the need to use an off-axis optical configuration that is common to other display systems. In addition, since the input aperture of the LOE is much smaller than the active area of the output aperture, the numerical aperture of the collimating lens 6 is much smaller than required for a comparable conventional imaging system. Consequently a significantly more convenient optical system can be implemented and the many difficulties associated with off-axis optics and high numerical-aperture lenses, such as field or chromatic aberrations can be compensated for relatively easily and efficiently.

3) The reflectance coefficients of the selectively reflective surfaces in the present invention are essentially identical over the entire relevant spectrum. Hence, both monochromatic and polychromatic, light sources may be used as display sources. The LOE has a negligible wavelength-dependence ensuring high-quality color displays with high resolutions.

4) Since each point from the input display is transformed into a plane wave that is reflected into the eye of the viewer from a large part of the reflecting array, the tolerances on the exact location of the eye can be significantly relaxed. As such, the viewer can see the entire field-of-view, and the eye-motion-box can be significantly larger than in other compact display configurations.

5) Since a large part of the intensity from the display source is coupled into the substrate, and since a large portion of this coupled energy is "recycled" and coupled out into the eye of the viewer, a display of comparatively high brightness can be achieved even with display sources with low power consumption.

FIG. 23 illustrates an embodiment of the present invention in which the LOE 20 is embedded in an eye-glasses frame 100. The display source 4, the collimating lens 6, and the folding lens 70 are assembled inside the arm portions 102 of the eye-glasses frame, just next to the edge of the LOE 20. For a case in which the display source is an electronic element such as a small CRT, LCD, or OLED, the driving electronics 104 for the display source might be assembled inside the back portion of the arm 102. A power supply and data interface 106 is connectable to arm 102 by a lead 108 or other communication means including radio or optical transmission. Alternatively, a battery and miniature data link electronics can be integrated in the eye-glasses frame.

The embodiment described above can serve in both see-through and non-see-through systems. In the latter case opaque layers are located in front of the LOE. It is not necessary to occlude the entire LOE, typically only the active area, where the display is visible needs to be blocked. As such, the device can ensure that the peripheral vision of the user is maintained, replicating the viewing experience of a computer or a television screen, in which such peripheral vision serves an important cognitive function. Alternatively, a variable filter can be placed in front of the system in such a way that the viewer can control the level of brightness of the light emerging from the external scene. This variable filter could be either a mechanically controlled device such as a folding filter, or two rotating polarizers, an electronically controlled device, or even an automatic device, whereby the transmittance of the filter is determined by the brightness of the external background.

There are some alternatives as to the precise way in which an LOE can be utilized in this embodiment. The simplest option is to use a single element for one eye. Another option is to use an element and a display source for each eye, but with the same image. Alternatively it is possible to project two different parts of the same image, with some overlap between the two eyes, enabling a wider FOV. Yet another possibility is to project two different scenes, one to each eye, in order to create a stereoscopic image. With this alternative, attractive implementations are possible, including 3-dimensional movies, advanced virtual reality, training systems and others.

The embodiment of FIG. 23 is just an example illustrating the simple implementation of the present invention. Since the substrate-guided optical element, constituting the core of the system, is very compact and lightweight, it could be installed in a vast variety of arrangements. Hence, many other embodiments are also possible including a visor, a folding display, a monocle, and many more. This embodiment is designated for applications where the display should be near-to-eye: head-mounted, head-worn or head-carried. There are, however, applications where the display is located differently. An example of such an application is a hand-held device for mobile application, such as for example a cellular phone. These devices are expected in the near future to perform novel operations, which require the resolution of a large screen, including videophone, Internet connection, access to electronic mail, and even the transmission of high-quality television satellite broadcasting. With the existing technologies, a small display could be embedded inside the phone, however, at present, such a display can project either video data of poor quality only, or a few lines of Internet or e-mail data directly into the eye.

FIG. 24 illustrates an alternative method, based on the present invention, which eliminate the current compromise between the small size of mobile devices and the desire to view digital content on a full format display, by projecting high quality images directly into the eye of the user. An optical module including the display source 6, the folding and collimating optics 70 and the substrate 20 is integrated into the body of a cellular phone 110, where the substrate 20 replaces the existing protective cover-window of the phone. Specifically, the volume of the support components including source 6 and optics 70 is sufficiently small to fit inside the acceptable volume for modern cellular devices. To view the full screen transmitted by the device the user positions the window in front of his eye 24, to conveniently view the image with high FOV, a large eye-motion-box and a comfortable eye-relief. It is also possible to view the entire FOV at a larger eye-relief by tilting the device to display different portions of the image. Furthermore, since the optical module can operate in see-through configuration, a dual operation of the device is possible; namely it is optionally possible to maintain the conventional cellular display 112 intact. In this manner the standard, low-resolution display can be viewed through the LOE when the display source 6 is shut-off. In a second mode, designated for e-mail reading. Internet surfing, or video operation, the conventional display 112 is shut-off while the display source 6 projects the required wide FOV image into the viewer's eye through the LOE. The embodiment described in FIG. 24 is only an example, illustrating that applications other than head-mounted displays can be materialized. Other possible hand-carried arrangements include palm computers, small displays embedded into wristwatches, a pocket-carried display having the size and weight reminiscent of a credit card, and many more.

The embodiments described above are mono-ocular optical systems, that is, the image is projected onto a single eye. There are, however, applications, such as head-up displays (HUD), wherein it is desired to project an image onto both eyes. Until recently, HUD systems have been used mainly in advanced combat and civilian aircraft. There have been numerous proposals and designs, of late, to install a HUD in front of a car driver in order to assist in driving navigation or to project a thermal image into his eyes during low-visibility conditions. Current aerospace HUD systems are very expensive, the price of a single unit being in the order of hundreds of thousands of dollars. In addition, the existing systems are very large, heavy, and bulky, and are too cumbersome for installation in a small aircraft let alone a car. LOE-based HUD potentially provide the possibilities for a very compact, self-contained HUD, that can be readily installed in confined spaces. It also simplifies the construction and manufacturing of the optical systems related to the HUD and therefore is a potentially suitable for both improving on aerospace HUD's, as well as introducing a compact, inexpensive, consumer version for the automotive industry.

FIG. 25 illustrates a method of materializing an HUD system based on the present invention. The light from a display source 4 is collimated by a lens 6 to infinity and coupled by the first reflecting surface 16 into substrate 20. After reflection at a second reflecting array (not shown), the optical waves impinge on a third reflecting surfaces 22, which couples the light out into the eyes 24 of the viewer. The overall system can be very compact and lightweight, of the size of a large postcard having a thickness of a few millimeters. The display source, having a volume of a few cubic centimeters, can be attached to one of the corners of the substrate, where an electric wire can transmit the power and data to the system. It is expected that the installation of the presented HUD system will not be more complicated than the installation of a simple commercial audio system. Moreover, since there is no need for an external display source for image projection, the necessity to install components in unsafe places is avoided.

Since the exit pupil of a typical HUD system is much larger than that of a head-mounted system, it is expected that a three-array configuration, as described above with reference to FIGS. 14-16, will be needed to achieve the desired FOV. There may be some special cases, however, including systems with small vertical FOVs, or with a vertical LED array as a display source, or by exploiting pairs of parallel reflecting mirrors (as described above with reference to FIG. 21) in which a two-array configuration would suffice.

The embodiments illustrated in FIG. 25 can be implemented for other applications, in addition to HUD systems for vehicles. One possible utilization of these embodiments is as a flat display for a computer or television. The main unique characteristic of such a display is that the image is not located at the screen plane, but is focused at infinity or to a similarly convenient distance. One of the main drawbacks of existing computer displays is that the user has to focus his eyes at a very close distance of between 40 and 60 cm, while the natural focus of a healthy eye is to infinity. Many people suffer from headaches after working for a long duration of time at a computer. Many others who work frequently with computers tend to develop myopia. In addition, some people, who suffer from both myopia and hyperopia, need special spectacles for work with a computer. A flat display, based on the present invention, could be an appropriate solution for people who suffer from the above-described problems and do not wish to work with a head-mounted display. Furthermore, the present invention allows for a significant reduction in the physical size of the screen. As the image formed by the LOE is larger than the device, it would be possible to implement large screens on smaller frames. This is particularly important for mobile applications such as lap and palm-top computers.

One potential problem that might arise with a large display LOE relates to its brightness. Ideally, for compactness it is advantageous to use a miniature display source, but this necessarily reduces the display brightness due to the large increase in the actively illuminated area of the LOE as compared to the actively illuminated area of the source. Therefore, even after the special measures described in the foregoing are deployed, one expects a reduction in the brightness, even for non-see through applications. This reduction in the brightness can be offset either by increasing the brightness of the source, or deploying more than one source. That is, the LOE can be illuminated with an array of display sources and their associated collimating lenses. FIG. 26 illustrates an example of this method. The same image is generated from an array of 4 display sources 4a through 4d, each collimated by a related array of lenses 6a through 6d to form a single collimated image, which is coupled into the LOE 20 by the reflecting surface 16. At a first glance it looks like this solution can be quite expensive. Here any increased system cost through increase in its components and the need to coordinate the sources images with special electronics is offset by the inherently low cost of the micro-displays themselves and the ability to reduce the numerical aperture of the collimating lenses. There is also no need for a lateral expander in this arrangement; it is quite feasible to include only a one-dimensional image expander LOE and increase the brightness accordingly. It is important to note that the display sources should not necessarily be identical to each other and a more complicated system with a different display sources can be utilized as explained in what follows.

Another advantage of the LOE display of the present invention is its very flat shape, even compared to the existing flat-panel displays. Another difference is a significantly more directional viewing angle: the LOE display can be viewed from a significantly limited angular range as compared to common flat-panel display. Such limited head-motion-box is sufficient for convenient operation by a single user, and offers the additional advantages of privacy in many situations.

Furthermore, the image of the LOE-based screen is located in a distant plane behind the display surface and not on its physical surface. The sensation of the image is similar to viewing it through a window. This configuration is particularly suitable for implementing three-dimensional displays.

Ongoing developments in information technology have led to an increasing demand for 3-D displays. Indeed, a broad range of 3-D equipment is already on the market. The available systems, however, suffer from the drawback that users are required to wear special devices to separate images intended for the left eyes and the right eye. Such "aided viewing" systems have been firmly established in many professional applications. Yet further expansion to other fields will require "free viewing" systems with improved viewing comfort and closer adaptation to the mechanisms of binocular vision. The present solutions to this problem suffer from various disadvantages and fall behind familiar 2-D displays in terms of image quality and viewing comfort.

Figure 27A:
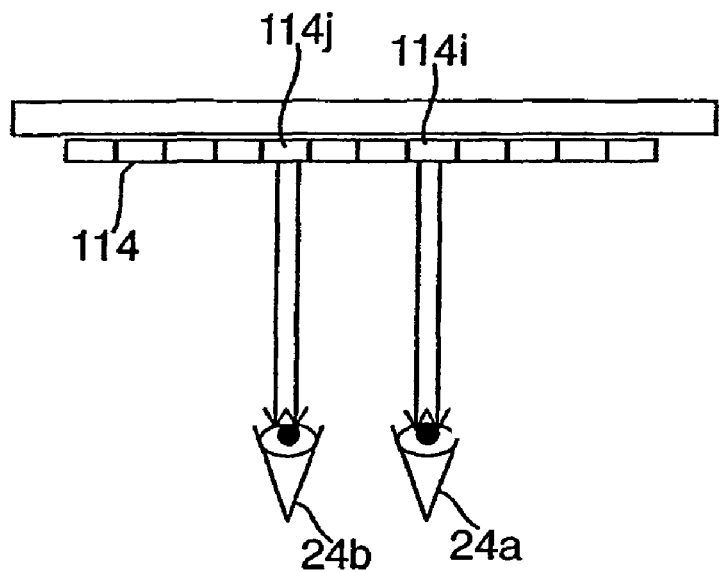
Figure 27B:
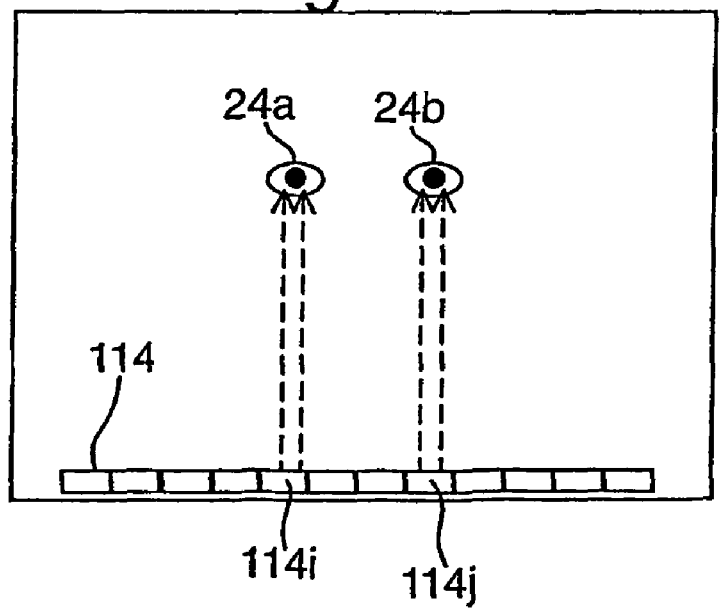
Figure 28A:
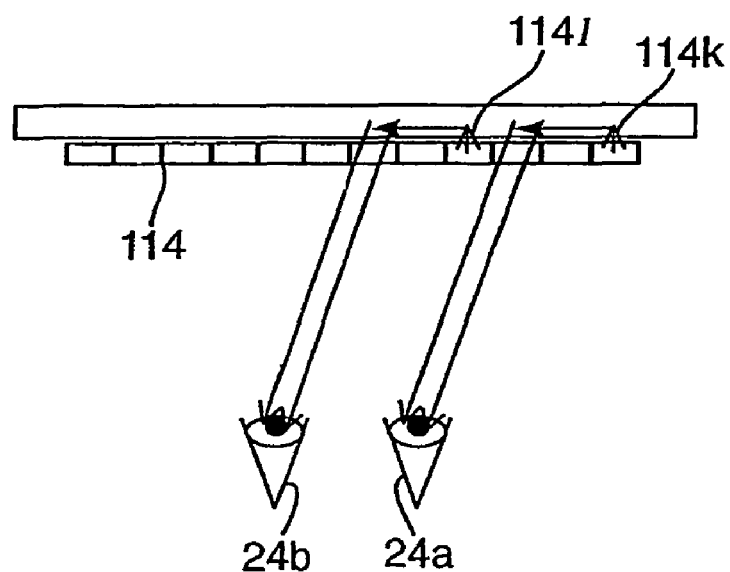
Figure 28B:
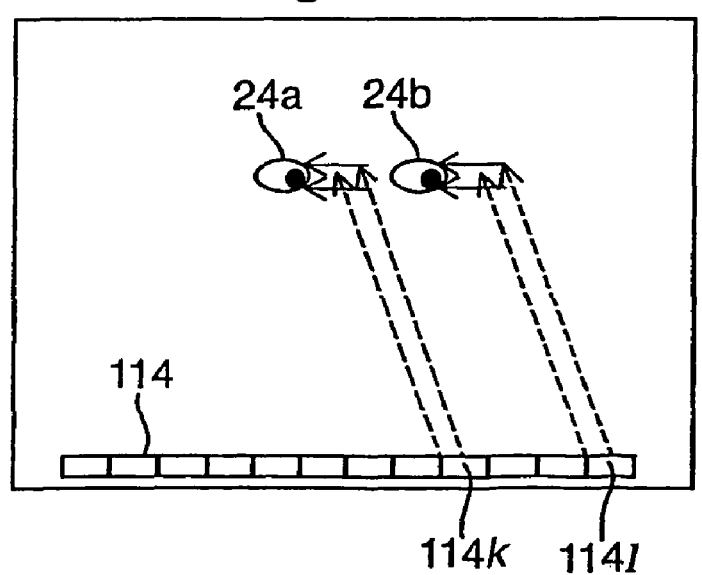
Figure 29A:
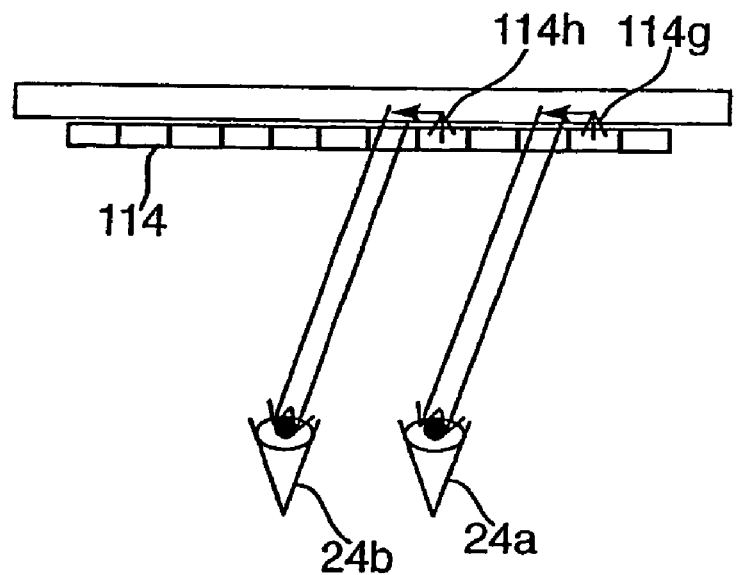
Figure 29B:
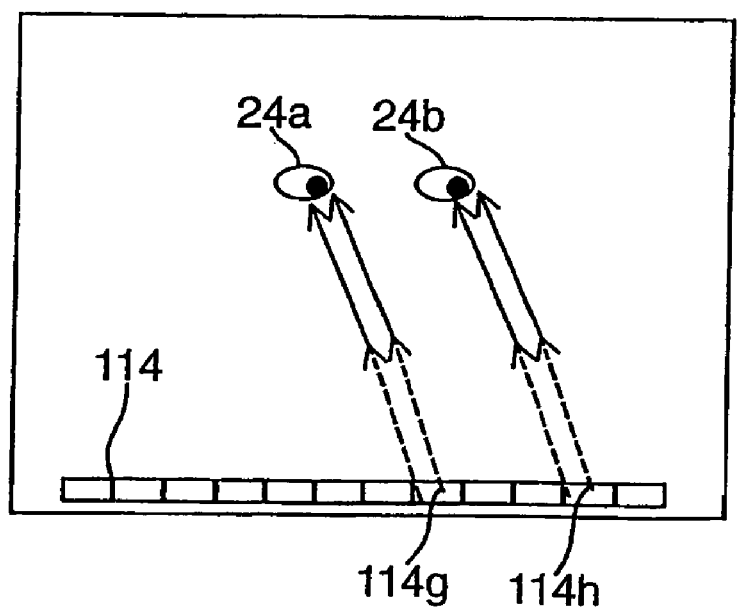

FIGS. 27A and 27B illustrate a front view and a top view, respectively, of a possible configuration, based on the present invention to materialize a real 3-D display. Instead of a single display source, an array 114 of n different display sources $114_1$ $114_n$ is located at the lower portion of the substrate 20, where each display source projects images obtained at different perspectives of the same scene. The image from each display source is coupled into the substrate in the same manner as described above with reference to FIG. 26. When the viewer is observing the display, his right 24a and left 24b eyes view the images projected from the display sources 114i and 114j, respectively. Consequently the viewer sees with each eye the same scene from a different perspective. The experience closely resembles the viewing experience when observing a real 3-D object through a window. As illustrated in FIGS. 28a-28b, when the viewer moves his gaze horizontally his eyes see the images which are projected from different display sources 114k and 114l; the effect is similar to moving the head across a window while looking at an external scene. When the viewer moves his gaze vertically, as illustrated in FIGS. 29A-29B, the eyes see points on the screen which are located lower then before. Since these points are located closer to the display sources 114, the viewer sees images which emerge from different display sources 114g and 114h, which are located closer to the center of the array 114 than before. As a result, the sensation of the viewer is similar to viewing a scene, which is closer to the window. That is, the scene through the substrate is seen as a three-dimensional panorama where the lower part of the scene is closer to the viewer.

The embodiment described above with regard to FIGS. 27-29 is only an example. Other arrangements for realizing a real 3-D display, with different apertures, number of aspect points and more are also possible by utilizing the present invention.

Another possible embodiment of the invention is its implementation as a teleprompter, such as used as to project text to a speaker or TV broadcaster; as the teleprompter is transparent, the audience feel that the speaker is making eye-contact with them while he is actually reading text. Utilizing an LOE, the teleprompter can be implemented with a small source, attached to the optical assembly, alleviating the need to locate large screen in the vicinity of the device.

Yet another possible implementation of this embodiment is as a screen for a personal digital assistance (PDA). The size of the existing conventional screens which are presently used, is under 10 cm. Since the minimal distance where these displays can be read is on the order of 40 cm, the obtainable FOV is under 15°; hence, the information content, especially as far as text is concerned, on these displays is limited. A significant improvement in the projected FOV can be made with the embodiment illustrated in FIG. 24. The image is focused at infinity, and the screen can be located much closer to the eyes of the viewer. In addition, since each eye sees a different part of the total filed-of-view (TFOV), with an overlap at its center, another increase in the TFOV may be achieved. Therefore, a display with an FOV of 40° or larger is feasible.

In all of the embodiments of the invention described above, the image which was transmitted by the substrate 20, originated from an electronic display source such as a CRT or LCD. There are, however, applications where the transmitted image can be a part of a living scene, for example, when it is required to couple a living scene onto an optical system.

FIG. 30 illustrates an application of star-light amplifier (SLA) 116 where this implementation is required. The image from the external scene is focused by the collimator 118 into the SLA where the electronic signal of the image is amplified to create a synthetic image which is projected through an eye-piece 120 onto the viewer eye. The illustrated configuration is fairly popular for military, para-military and civilian applications. This commonly used configuration necessarily protrudes forward in front of the user and makes it inconvenient for protracted use in a head-mounted configuration. The device is relatively heavy and in addition to its physically interference with objects in the vicinity of the user, and it exerts a strenuous moment on the user's head and neck.

A more convenient configuration is illustrated in FIG. 31. Here, the device is not located in front of the user but to the side of the head, where the center of the gravity of the SLA is aligned along the main-axis of the head. The direction of the device is reversed, that is, the collimator 118 is located at the rear and the eye-piece 120 is located at the front. Now, the image from the frontal external scene is coupled into the collimator 118 by using an LOE 20a, where the image from the eye-piece 120 is coupled into the user's eye by using another LOE 20b. Though additional two optical elements, 20a and 20b, are added to the original device, the weight of these elements is negligible compared to the weight of the SLA and the overall configuration is much more convenient than before. Furthermore, as the mounting tolerance of these devices is far from demanding, it is feasible that these two elements be configures as modular so that they can be either shifted away from their position or even removed by the user. In this manner the SLA viewer can be reconfigured for convenient location for head-mounted operation with the LOE mounted, or for mounting on standard gun-sites or other aiming devices for use without the LOE modules. It is also possible to shift the LOE's so as to accommodate the use of the device with either eye.

In all of the embodiments described above, the LOE is utilized to transmit light waves for imaging purposes. The present invention, however, can be applied not only for imaging, but also for non-imaging applications, mainly illumination systems, in which the optical quality of the output wave is not crucial and the important parameters are intensity and uniform brightness. The invention may be applied, for example, in back illumination of flat-panel displays, mostly LCD systems, in which, in order to construct an image, it is necessary to illuminate the plate with a light as bright and uniform as possible. Other such possible applications include, but are not limited to, flat and non-expensive substitutes for room illumination or for floodlights, illuminators for fingerprint scanners, and readout waves for 3-dimensional display holograms.

One of the illumination utilizations that can be considerably improved by using an LOE device is for a reflective LCD. FIG. 32 illustrates an example of a substrate-mode display where the display source is a reflection LCD. The light generated by an illuminator 122 passes through a polarizer 124, collimated by a lens 126, reflected by a polarizing beamsplitter 128 and illuminates an LCD 130. The polarization of the light which is reflected from the LCD is rotated in 90° by a ¼ wavelengths plate, or alternatively by the LCD material itself. The image from the LCD now passes through the beamsplitter to be collimated and reflected by the lens 132 onto the substrate 20. As a result of the beamsplitter configuration, the entire illuminating system is large and cumbersome, and certainly not compact enough for head-mounted systems. Moreover, because of the beamsplitter 128 the collimating lens 132 is located further away from the display source, while for the sake of minimizing the aberrations it is required that the field-lens will be located as close as possible to the display surface.

An improved version of the illuminating setup is illustrated in FIG. 33. The light from the light source 122 coupled into another LOE 134, which illuminates the surface of the LCD 130, where the partially reflective surfaces are polarizing sensitive. Apparently, the entire system here is much more compact than that illustrated in FIG. 32, and the lens 132 is located much closer to the LCD surface. In addition, since the input aperture of the LOE 134 is much smaller than that of the beamsplitter 128, the collimating lens 126 can be now much smaller than before, and therefore have a larger f-number. The illuminating arrangement shown in FIG. 32 is only an example. Other arrangements for illuminating a reflective or transmission LCD, or for using for any other illuminating purposes in accordance with the optical system and the desired parameters, are also permissible.

An important issue that should be addressed is the fabricating process of the LOE, where the crucial component is the array of selectively reflecting surfaces 22. FIG. 34 illustrates a possible method of fabricating an array of partially reflecting surfaces. The surfaces of a plurality of transparent flat plates 138 are coated with the required coatings 140 and then the plates are cemented together so as to create a stack form 142. A segment 144 is then sliced off the stack form by cutting, grinding and polishing, to create the desired array of reflecting surfaces 146, which can be assembled with other elements to materialize the entire LOE. More than one array 146 can be fabricated of each segment 144, according to the actual size of the coated plates 138 and the required size of the LOE. As described in FIGS. 4-7, the required coatings of the selectively reflecting surfaces should have a specific angular and spectral response in order to assure a proper operation of the LOE. Hence, it is essential to accurately measure the actual performance of the coatings before the final fabrication of the LOE. As explained above, there are two angular regions that should be measured—the high incident angles (usually between 60° and 85°) where the reflectance is very low and the low incident angles (usually between 15° and 40°), where the reflectance of the surfaces is utilized to couple part of the trapped waves out of the LOE. Naturally, the coating should be measured at these two regions. The main problem of the testing procedure is that it is very difficult to measure with the existing testing equipment the reflectance (or alternatively the transmission) for very high angles of incidence, usually above 60°, for coatings that are located, as in our case, between two transparent plates.

FIG. 35 illustrates a method proposed to measure the reflection of a coated surface 150 at very high incident angles. Initially two prisms 152 with an angle α are attached to the coated plate. The incoming beam 154 impinges on the coated plate at an incident angle α. Part of the beam 156 continues at the original direction and its intensity $T_\alpha$ can be measured. Hence, taking into account the Fresnel reflections from the external surface, the reflectance of the measured coating at the angle α can be calculated as $R_\alpha=1-T_\alpha$. In addition, the other part of the beam is reflected from the coated surface, reflected again by total internal reflection from the external surface of the lower prism, impinges at the coated surface again at an angle 3α, reflected again from the external surface of the upper prism by total internal reflection, and then reflected by the coated surface at an angle α and coupled out from the prism. Here, the intensity of the output beam 158 can be measured. Taking into account the Fresnel reflections, the intensity of the output beam is $(R_\alpha)^2*T_{3\alpha}$. Hence, knowing the reflectance $R_\alpha$ from the previous step, the reflectance at an angle 3α can be calculated accordingly. There are testing equipments where the output beam must be located at the same axis of the incoming beam. FIG. 36 illustrates a folding prism 160 used to translate the beam into that of the original beam. The residue of the original ray 154 can be blocked using a suitable mask or blocking layer 162.

Evidently, each pair of prisms can measure the reflectance at two angles—α and 3α. For instance, if the head angle is 25° then the reflectance at 25° and 75° can be measured simultaneously. Therefore, a small number of prism pairs (2 or 3) is usually requested for a proper measurements of the coated plates. Naturally, the setup shown here can be utilized to measure the reflectance of these two angles at different wavelengths as well as for the two polarizations, if required.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical device, comprising:
   a display source emitting light waves;
   a selective diffuser for non-uniformly diffusing the light waves of the display source;
   an imaging optical lens for imagine the light waves from said display source;
   a light-transmitting substrate having a light-admitting surface and at least one surface located inside said substrate for coupling the light waves out of said substrate;
   an optical coupler for coupling the light waves from said imaging optical lens into said substrate
   characterized in that
   the light waves from the entire display source are coupled by the optical coupler via said light-admitting surface into the substrate by total internal reflection.

2. The optical device according to claim 1 further comprising at least one light source.

3. The optical device according to claim 2 further comprising at least one converging lens disposed between the light source and the display source.

4. The optical device according to claim 3, wherein said converging lens collects the light waves from said light source and illuminates said display source.

5. The optical device according to claim 4, wherein said selective diffuser diffuses the light waves interposed between said converging lens and said display source.

6. The optical device according to claim 4, wherein each light wave emerging from a single point on the display source is diverged into a predetermined finite solid angle, such that light waves from the entire display source are coupled into said substrate by total internal reflection.

7. The optical device according to claim 6, wherein optical nature and structure of the combination of said light source, converging lens, display source and selective diffuser, dictate said solid angles, resulting in coupling said light waves into said substrate by total internal reflection.

8. The optical device according to claim 6, wherein optical nature and structure of the combination of the components of said optical device result in coupling said light waves into a single eye of an observer.

9. The optical device according to claim 8, wherein optical nature and structure of the combination of the components of said optical device result in a specific brightness at the eye of the observer.

10. The optical device according to claim 6, wherein optical nature and structure of the combination of the components of said optical device result in coupling said light waves into both eyes of an observer.

11. The optical device according to claim 10, wherein optical nature and structure of the combination of the components of said optical device result in a specific brightness at the eyes of the observer.

12. The optical device according to claim 1, wherein from each point source on said display source, only a specific angular cone of light actually couples into said substrate.

13. The optical device according to claim 12, wherein said selective diffuser spreads the light from said point source of said display source into said specific angular cone.

14. The optical device according to claim 1, wherein input waves and image waves are located on the same side of said substrate.

15. The optical device according to claim 1, wherein input waves and image waves are located on the opposite sides of said substrate.

16. The optical device according to claim 1, wherein said optical device is utilized as head mounted display.

17. The optical device according to claim 1, wherein said optical device is utilized as head up display.

* * * * *